US011187971B1

(12) United States Patent
Chapman et al.

(10) Patent No.: US 11,187,971 B1
(45) Date of Patent: *Nov. 30, 2021

(54) ROTATING CONTACT ASSEMBLIES FOR SELF-LEVELING CAMERA HEADS

(71) Applicant: SeeScan, Inc., San Diego, CA (US)

(72) Inventors: Eric M. Chapman, Lake Tapps, WA (US); Mark S. Olsson, La Jolla, CA (US); Nicholas A. Smith, San Diego, CA (US); Alexander L. Warren, Escondido, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,153

(22) Filed: May 2, 2019

Related U.S. Application Data

(63) Continuation of application No. 14/136,104, filed on Dec. 20, 2013, now Pat. No. 10,288,997.

(60) Provisional application No. 61/780,865, filed on Mar. 13, 2013, provisional application No. 61/740,438, filed on Dec. 20, 2012.

(51) Int. Cl.
*H04N 7/18* (2006.01)
*G03B 37/00* (2021.01)
*H04N 5/225* (2006.01)
*G03B 17/02* (2021.01)

(52) U.S. Cl.
CPC ......... *G03B 37/005* (2013.01); *H04N 5/2251* (2013.01); *G03B 17/02* (2013.01); *G03B 2217/002* (2013.01); *G03B 2217/007* (2013.01); *H04N 2005/2255* (2013.01)

(58) Field of Classification Search
CPC ............ G03B 37/005; G03B 2217/007; G03B 17/02; G03B 2217/002; H04N 5/2251; H04N 2005/2255
See application file for complete search history.

(56) References Cited

U.S. PATENT DOCUMENTS

| 4,384,225 | A | * | 5/1983 | Iwaki | H02K 5/141 310/239 |
|---|---|---|---|---|---|
| 5,865,629 | A | | 2/1999 | Bernardini | |
| 6,517,357 | B1 | | 2/2003 | Athanasiou et al. | |
| 6,611,661 | B2 | * | 8/2003 | Buck | G03B 17/00 396/19 |
| 6,908,310 | B1 | | 6/2005 | Olsson et al. | |

(Continued)

FOREIGN PATENT DOCUMENTS

EP    1227554 A1    7/2002

OTHER PUBLICATIONS

ASTM, "B679-98(2009): Standard Specification for Electrodeposited Coatings of Palladium for Engineering Use," Specification, 2009, USA.

(Continued)

*Primary Examiner* — Richard T Torrente
(74) *Attorney, Agent, or Firm* — Steven C. Tietsworth, Esq.

(57) ABSTRACT

Electrical contact assemblies for use in rotating video camera heads are disclosed. A contact assembly may include a first element movable relative to the camera head's housing on which an imager is disposed, a second element rotationally movable relative to the first element, and a slip ring including one or more PCB brush elements to transfer imager signals to an output connector.

8 Claims, 39 Drawing Sheets

(56) References Cited

U.S. PATENT DOCUMENTS

| | | |
|---|---|---|
| 2002/0131781 A1 | 9/2002 | Buck |
| 2005/0012426 A1* | 1/2005 | Angerpointner ....... H01R 39/24 |
| | | 310/248 |
| 2005/0275725 A1* | 12/2005 | Olsson ................. H04N 5/2257 |
| | | 348/207.99 |
| 2007/0040468 A1* | 2/2007 | Ki .......................... H02K 7/063 |
| | | 310/247 |
| 2007/0221774 A1 | 9/2007 | Kim et al. |
| 2008/0207814 A1* | 8/2008 | Wrosch ............. C08F 222/1006 |
| | | 524/440 |
| 2010/0233506 A1* | 9/2010 | Tokuhara ................. C25D 5/10 |
| | | 428/637 |

OTHER PUBLICATIONS

Department of Defense, "MIL-R-46085B: Rhodium Plating, Electrodeposited," Military Specification, Apr. 24, 1984, USA.
International Searching Authority, "Written Opinion of the International Searching Authority" for PCT Patent Application No. PCT/US13/76929, dated Jun. 20, 2015, European Patent Office, Munich.

\* cited by examiner

Example Details of Slip Ring Embodiment
(Front View with One Substrate Element Omitted)

Example Details of Slip Ring Embodiment (Top View)

Example Details of Slip Ring Embodiment
(Front View with One Substrate Element Omitted)

Example of Camera Head Miniaturization Embodiment

Example Details of Cylindrical Ring Assembly Embodiment

Example Details of Brush Module Embodiment

Example Details of Brush Element Embodiment

ROTATING CONTACT ASSEMBLIES FOR SELF-LEVELING CAMERA HEADS

CROSS-REFERENCE TO RELATED APPLICATIONS

This application is a continuation of and claims priority to U.S. Utility patent application Ser. No. 14/136,104, entitled ROTATING CONTACT ASSEMBLIES FOR SELF-LEVELING CAMERA HEADS, filed Dec. 20, 2013, which claims priority under 35 U.S.C. § 119(e) to U.S. Provisional Patent Application Ser. No. 61/740,438, entitled ROTATING CONTACT ASSEMBLIES FOR SELF-LEVELING CAMERA HEADS, filed Dec. 20, 2012, and to U.S. Provisional Patent Application Ser. No. 61/780,865, entitled ROTATING CONTACT ASSEMBLIES FOR SELF-LEVELING CAMERA HEADS, filed Mar. 13, 2013. The content of each of these applications is hereby incorporated by reference herein in it is entirety for all purposes.

FIELD

This disclosure relates generally to camera heads or other devices including rotating contact assemblies. More specifically, but not exclusively, the disclosure relates to self-leveling camera heads or other devices employing rotating contact assemblies in the form of slip rings having a cylindrical ring assembly and a flexible or bendable brush assembly.

BACKGROUND

Rotating contact assemblies using slip rings to provide electrical contacts between moving elements are known in the art. Existing contact assemblies are typically complex in design, resulting in difficulties in manufacture. Furthermore, the complexity of camera heads employing existing rotating contact assemblies may also result in a larger than necessary overall package and reduced reliability, requiring heaving weights in a self leveling camera using counterweights to self-level, resulting in heavier and/or larger camera heads or other devices.

As used in pipe inspection systems, self leveling camera heads may be required to fit into small or constrained areas, such as within a clogged pipe or drain, thus placing larger camera heads at a disadvantage relative to smaller camera heads. In some applications, larger camera heads cannot be used at all due to their size, and in many applications a smaller camera head may provide advantages even when size is not a constraint. In addition, cameras and other devices utilizing rotating contact mechanisms known in the art may also suffer from premature failure and greater electrical noise due to unwanted internal dirt and other debris.

Accordingly, there is a need in the art to address the above-described as well as other problems.

SUMMARY

This disclosure relates generally to camera heads or other devices including rotating contact assemblies. More specifically, but not exclusively, the disclosure relates to a self-leveling camera heads or other devices employing rotating contact assemblies in the form of slip rings having a cylindrical ring assembly and a flexible or bendable brush assembly.

For example, in one aspect, a rotating contact assembly in accordance with certain aspects may include an innovative brush-contact system. In such a brush-contact system, circuit board fabrication methods may be used for the manufacture of brush elements with electrical contacts, which may be flexed to remain in contact with corresponding ring assembly electrical contacts. These circuit board brush contacts may be coated or have attached contact assemblies to increase hardness and oxide resistance with, for instance, palladium nickel, rhodium, or hard gold, though a variety of other materials may be used as a suitable coating.

In another aspect, a cylindrical ring assembly may include a plurality of electrical contact surfaces which may be held in contact with the brush assemblies to provide continuous electrical connectivity during rotation of the ring assembly relative to the brush assembly.

In another aspect, a camera head which may employ the force of gravity to enable self leveling may be created using the previously mentioned brush and ring contact system. In such camera heads, a rotating contact assembly employing this brush contact system may allow for rotations of the imaging component in order to self level, while maintaining electrical connectivity between the rings contacts and brush contacts.

The geometry of a camera head in accordance with aspects of the present disclosure may result in a camera head of smaller overall package size and/or enhanced manufacturability and improved durability relative to prior art camera heads.

In another aspect, a video inspection system utilizing a self-leveling camera head may be implemented in accordance with various aspects. The video inspection system may be a pipe inspection system utilizing such a self-leveling camera.

In another aspect, the disclosure relates to a camera head. The camera head may include, for example, a housing, an imager disposed within the housing on a first element movable relative to the housing, a second element rotationally movable relative to the first element, the second element including an electrical output connection, and a slip ring coupled between the first element and the second element to provide an electrical connection between an output of the imager and the electrical output connection. The slip ring may include a cylindrical ring assembly including one or more ring electrical contacts and a brush assembly disposed around the cylindrical ring assembly. The brush assembly may include one or more brush electrical contacts positioned in contact with corresponding ones of the one or more ring electrical contacts. The camera head may further include a counterweight to self-level the imaging sensor via gravity.

In another aspect, the disclosure relates to a slip ring apparatus. The slip ring apparatus may include, for example, a cylindrical ring assembly including one or more ring electrical contacts, and a brush assembly disposed around the cylindrical ring assembly, the brush assembly including one or more brush electrical contacts positioned in contact with corresponding ones of the one or more ring electrical contacts.

In another aspect, grease and/or other debris trap material, such as flypaper or other materials may be disposed on or within a camera head and associated elements to prevent unwanted dirt and debris from interfering with internal components to aid in preventing premature failure and/or unnecessary electrical noise. In some embodiments, the debris trap material may include adhesive tape material.

In another aspect, the disclosure relates to a video inspection system. The video inspection system may include, for example, a video display and a camera head. The camera head may include a housing, an imager disposed within the housing on a first element movable relative to the housing, a second element rotationally movable relative to the first element, the second element including an electrical output connection, and a slip ring coupled between the first element and the second element to provide an electrical connection between an output video signal of the imager and the electrical output connection. The slip ring may include a cylindrical ring assembly including one or more ring electrical contacts, and a brush assembly disposed around the cylindrical ring assembly, the brush assembly including one or more brush electrical contacts positioned in contact with corresponding ones of the one or more ring electrical contacts. The video inspection system may further include a communications link between the camera head and the video display system to couple the output video signal from the electrical output connection to the video display system. The communications link may be a wired or wireless communications link, such as a wired cable or connector or wireless 802.11, Bluetooth, or other wireless communications module.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Figure 1:
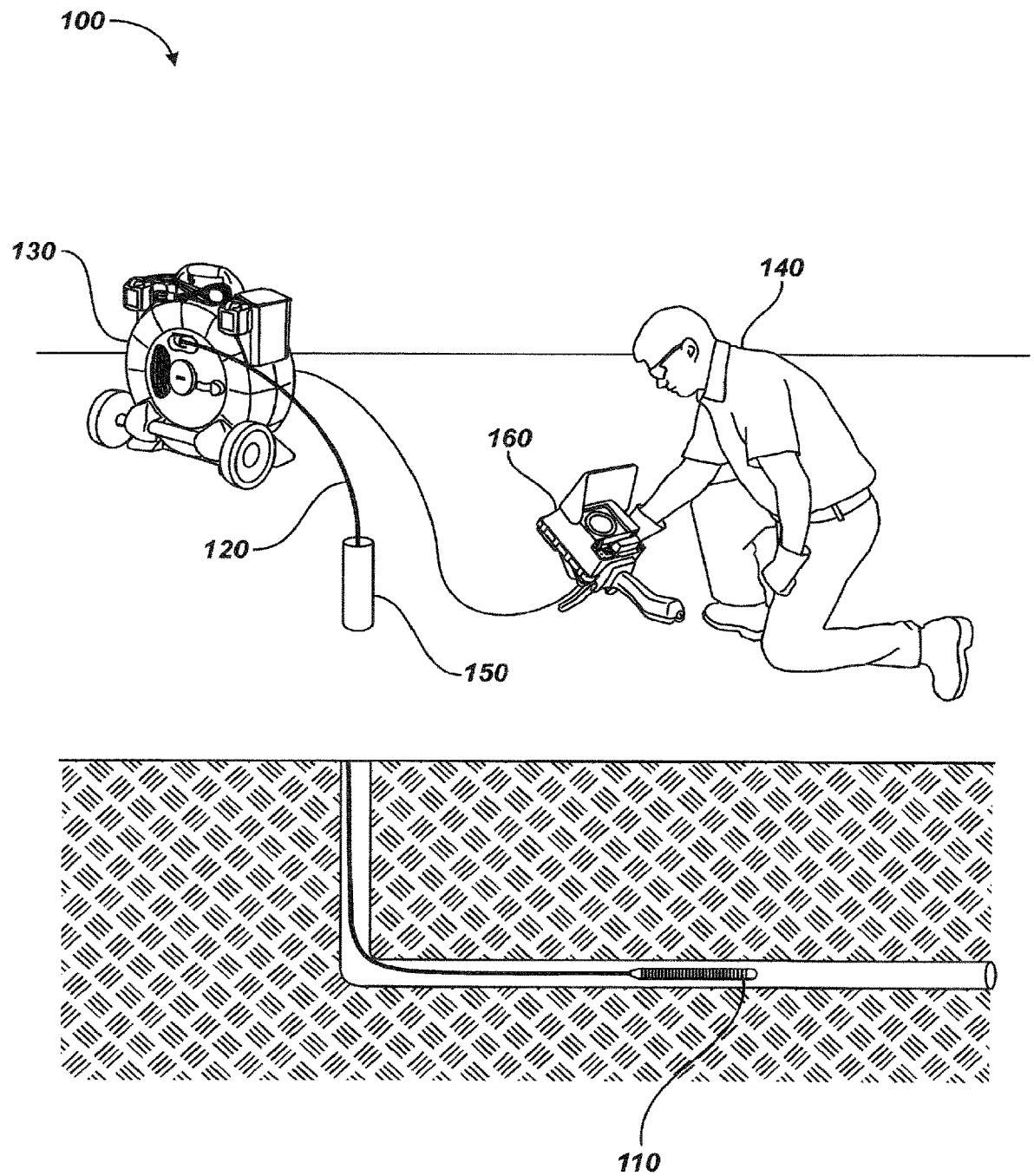
FIG. 1 is an illustration of an operator using a pipe inspection system which may include aspects of the disclosure.

This disclosure relates generally to camera heads or other devices including rotating contact assemblies. More specifically, but not exclusively, the disclosure relates to a self-leveling camera heads or other devices employing rotating contact assemblies in the form of slip rings having a cylindrical ring assembly and a flexible or bendable brush assembly.

Various details of the disclosure herein may be combined with inspection camera systems and components such as those described in co-assigned patents and patent applications including U.S. Pat. No. 6,697,102, issued Feb. 24, 2004, entitled BORE HOLE CAMERA WITH IMPROVED FORWARD AND SIDE VIEW ILLUMINATION, U.S. Pat. No. 6,831,679, issued Dec. 14, 2004, entitled VIDEO CAMERA HEAD WITH THERMAL FEEDBACK LIGHTING CONTROL, U.S. Pat. No. 6,862,945, issued Mar. 8, 2005, entitled CAMERA GUIDE FOR VIDEO PIPE INSPECTION SYSTEM, U.S. Pat. No. 6,958,767, issued Oct. 25, 2005, entitled VIDEO PIPE INSPECTION SYSTEM EMPLOYING NON-ROTATING CABLE DRUM STORAGE, U.S. patent application Ser. No. 11/928,818, filed Oct. 30, 2007, entitled PIPE MAPPING SYSTEM, U.S. Patent Application No. 61/034,907, filed Mar. 7, 2008, entitled PIPE INSPECTION IMAGING SYSTEM, U.S. patent application Ser. No. 12/704,808, filed Feb. 12, 2010, entitled PIPE INSPECTION SYSTEM WITH REPLACEABLE CABLE STORAGE DRUM, U.S. patent application Ser. No. 12/399,859, filed Mar. 6, 2009, entitled PIPE INSPECTION SYSTEM WITH SELECTIVE IMAGE CAPTURE, U.S. patent application Ser. No. 12/975,496, filed Jun. 8, 2012, entitled Multi-Camera Pipe Inspection Apparatus, Systems, & Methods, U.S. patent application Ser. No. 13/358,463, filed Jan. 25, 2012, entitled SELF-LEVELING INSPECTION SYSTEMS AND METHODS, U.S. Provisional Patent Application Ser. No. 61/740,438, filed Dec. 20, 2012, entitled ROTATING CONTACT ASSEMBLIES FOR SELF-LEVELING CAMERA HEADS and U.S. patent application Ser. No. 13/358,463, filed Jan. 25, 2012, entitled Self-Leveling Inspection Systems and Methods. The content of each of these applications is incorporated by reference herein in its entirety. These applications may be individually or collectively referred to herein as the "incorporated applications."

Example details of pipe inspection system and associated self-leveling camera head apparatus are described in the incorporated applications, and may be combined with the disclosures herein in various embodiments.

Overview

This disclosure relates generally to camera heads or other devices including rotating contact assemblies. More specifically, but not exclusively, the disclosure relates to a self-leveling camera heads or other devices employing rotating contact assemblies in the form of slip rings having a cylindrical ring assembly and a flexible or bendable brush assembly.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

In one aspect, a rotating contact assembly in accordance with certain aspects may include an innovative brush-contact system. In such a brush-contact system, circuit board fabrication methods may be used for the manufacture of brush elements with electrical contacts, which may be flexed to remain in contact with corresponding ring assembly electrical contacts. These circuit board brush contacts may be coated or have attached contact assemblies to increase hardness and oxide resistance with, for instance, palladium nickel, rhodium, or hard gold, though a variety of other materials may be used as a suitable coating.

In another aspect, a cylindrical ring assembly may include a plurality of electrical contact surfaces which may be held in contact with the brush assemblies to provide continuous electrical connectivity during rotation of the ring assembly relative to the brush assembly.

In another aspect, strategically place grease and/or other debris trap material, such as flypaper, may be used to prevent unwanted dirt and debris from interfering with internally components to aid in preventing premature failure and/or unnecessary electrical noise. In some embodiments, the debris trap material may include adhesive tape material.

In another aspect, a camera head which may employ the force of gravity to enable self leveling may be created using the previously mentioned brush and ring contact system. In such camera heads, a rotating contact assembly employing this brush contact system may allow for rotations of the imaging component in order to self level, while maintaining electrical connectivity between the rings contacts and brush contacts.

The geometry of a camera head in accordance with aspects of the present disclosure may result in a camera head of smaller overall package size and/or enhanced manufacturability and improved durability relative to prior art camera heads.

In another aspect, a video inspection system utilizing a self-leveling camera head may be implemented in accordance with various aspects. The video inspection system may be a pipe inspection system utilizing such a self-leveling camera.

In another aspect, the disclosure relates to a camera head. The camera head may include, for example, a housing, an imager disposed within the housing on a first element movable relative to the housing, a second element rotationally movable relative to the first element, the second element including an electrical output connection, and a slip ring coupled between the first element and the second element to provide an electrical connection between an output of the imager and the electrical output connection. The slip ring may include a cylindrical ring assembly including one or more ring electrical contacts and a brush assembly disposed around the cylindrical ring assembly. The brush assembly may include one or more brush electrical contacts positioned in contact with corresponding ones of the one or more ring electrical contacts. The camera head may further include a counterweight to self-level the imaging sensor via gravity.

The brush assembly may include, for example, one or more brush elements. The brush electrical contacts may be on or within the brush element. The brush element may include a plurality of tines or fingers. The plurality of tines or fingers may be configured to intertwine with tines or fingers of other brush elements in the brush assembly. The electrical contacts may be electrical signal pads or traces on the tines or fingers. The brush assembly may include a plurality of brush elements having fingers or tines, wherein the fingers or tines of the brush elements are interleaved in the brush assembly. The interleaved fingers or tines of the plurality of brush elements may include redundant electrical contacts relative to the cylindrical ring assembly electrical contacts.

The brush element may, for example, include a printed circuit board (PCB). The electrical contacts may be electrically conductive areas on or within the PCB. The electrical contacts may be wires or other electrical conductors attached or coupled to the PCB. The electrically conductive areas on the PCB may be electrical circuit pads or traces. The brush electrical contacts and/or cylindrical ring electrical contacts may be coated with one or more of palladium, nickel, rhodium, hard gold, or other similar or equivalent materials to decrease frictional contact erosion and/or corrosion.

The cylindrical ring assembly may include, for example, one or more electrical contacts. The electrical contacts may be contacts on one or more contact rings. The cylindrical ring assembly may include a plurality of contact rings. The cylindrical ring assembly may include one or more dielectric separate rings. The cylindrical ring assembly may further include a contact guide cap.

In another aspect, the disclosure relates to a slip ring apparatus. The slip ring apparatus may include, for example, a cylindrical ring assembly including one or more ring electrical contacts, and a brush assembly disposed around the cylindrical ring assembly, the brush assembly including one or more brush electrical contacts positioned in contact with corresponding ones of the one or more ring electrical contacts.

The brush assembly may include, for example, one or more brush elements. The brush electrical contacts may be on or within the brush element. The brush element may include a plurality of tines or fingers. The plurality of tines or fingers may be configured to intertwine with tines or fingers of other brush elements in the brush assembly. The electrical contacts may be electrical signal pads or traces on the tines or fingers. The brush assembly may include a plurality of brush elements having fingers or tines, wherein the fingers or tines of the brush elements are interleaved in the brush assembly. The interleaved fingers or tines of the plurality of brush elements may include redundant electrical contacts relative to the cylindrical ring assembly electrical contacts.

The brush element may, for example, include a printed circuit board (PCB). The electrical contacts may be electrically conductive areas on or within the PCB. The electrical contacts may be wires or other electrical conductors attached or coupled to the PCB. The electrically conductive areas on the PCB may be electrical circuit pads or traces. The brush electrical contacts and/or cylindrical ring electrical contacts may be coated with one or more of palladium, nickel, rhodium, hard gold, or other similar or equivalent materials to decrease frictional contact erosion and/or corrosion.

The cylindrical ring assembly may include, for example, one or more electrical contacts. The electrical contacts may be contacts on one or more contact rings. The cylindrical ring assembly may include a plurality of contact rings. The cylindrical ring assembly may include one or more dielectric separate rings. The cylindrical ring assembly may further include a contact guide cap.

In another aspect, the disclosure relates to a video inspection system. The video inspection system may include, for example, a video display and a camera head. The camera head may include a housing, an imager disposed within the housing on a first element movable relative to the housing, a second element rotationally movable relative to the first element, the second element including an electrical output connection, and a slip ring coupled between the first element and the second element to provide an electrical connection between an output video signal of the imager and the electrical output connection. The slip ring may include a cylindrical ring assembly including one or more ring electrical contacts, and a brush assembly disposed around the cylindrical ring assembly, the brush assembly including one or more brush electrical contacts positioned in contact with corresponding ones of the one or more ring electrical contacts. The video inspection system may further include a communications link between the camera head and the video display system to couple the output video signal from the electrical output connection to the video display system. The communications link may be a wired or wireless communications link, such as a wired cable or connector or wireless 802.11, Bluetooth, or other wireless communications module.

Some embodiments may use a lubricant on slip contact surfaces, such as Superlube with include PTFE (Teflon). Low temperature, compliant solder may be used to ease assembly and reduce likelihood of failure during impacts, such as when a camera head in a pipe inspection system impacts a pipe obstruction or is dropped by a user. Example solder materials include, but are not limited to, Alpha WS-852 and Indium Corp. Alloys 281 or 282.

A dessicant may be included internally in the camera housing to remove moisture and reduce fogging and/or corrosion internal to the camera head. Bearings within the camera head or coupled to the camera head for use with moving parts may be ball bearings, and the ball bearings may be metal or ceramic balls. Ceramic balls may advantageously lower weight and/or provide better impact resistant. A light oil on the bearings may provide both frictional improvements and act as a damping agent to limit rotational oscillations of elements such as leveling mechanisms during impacts or accelerations. An oven reflow process may be used to provide potential advantages in manufacturing.

Although the position of the brushes and rings are shown in a particular exemplary configuration and described accordingly herein, in some embodiments they may be swapped or interchanged, in whole or in part.

Various additional aspects, features, and functionality are further described below in conjunction with the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Rotating Contact Assemblies for
Self-Leveling Camera Heads

Turning to FIG. 1, one application for a rotating contact assembly in keeping with aspects of the present disclosure may include a pipe inspection system using a self-leveling camera head. FIG. 1 illustrates one example embodiment 100 of such a pipe inspection system. Pipe inspection system 100 may include a self-leveling camera head 110 secured to a push-cable 120 that further connects to a push-cable reel 130 such that a user 140 may dispense the self-leveling camera head 110 and push-cable 120 into an area being expected, such as the interior of pipe 150 as shown (or other inspection areas, such as the interiors of pipes, conduits, cavities, inside walls, etc.). In some pipe inspection systems, such as pipe inspection system 100, a camera control unit ("CCU"), such as the camera control unit 160 as shown, may be used to monitor video feed from within the pipe 150. Data such as video, images, audio signals, environmentally sensed conditions, and the like may be transferred from the camera head 110 to the CCU (or other coupled computer-based devices) for display, storage, transmission to other systems, and the like.

In order to facilitate rotating contacts in a camera head such as camera head 110 (or in other applications requiring rotating contacts or slip ring type connections), camera head 110 may include a slip ring assembly comprising a cylindrical ring assembly and corresponding brush assembly, wherein the cylindrical ring assembly rotates, relative to the brush assembly, about an axis, while electrical contacts on the ring assembly maintain an electrical signal path to corresponding contacts on the brush assembly during axial rotation of the cylindrical ring assembly.

The slip ring assembly may include one or more ring electrical contacts and a brush assembly disposed around the cylindrical ring assembly. The brush assembly may include one or more brush electrical contacts positioned in contact with corresponding ones of the one or more ring electrical contacts in various configurations.

Figure 31A:
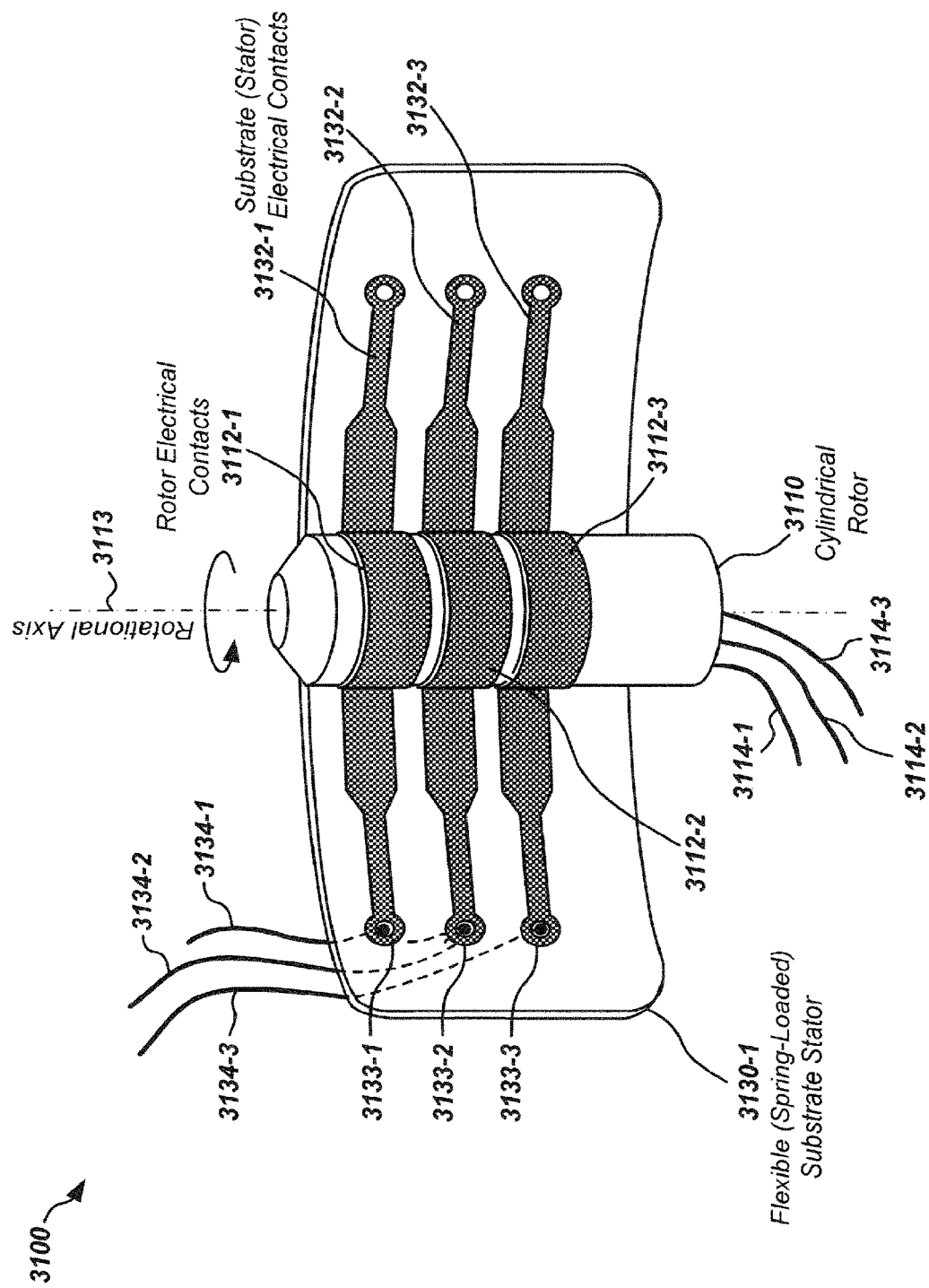
FIG. 31A illustrates details of an example embodiment of elements of a slip ring assembly from a side view in accordance with certain aspects.

For example, FIG. 31A illustrated details of an embodiment of a brush assembly 3100 and corresponding cylindrical ring assembly 3110, which may form the core elements of a slip ring for use in self-leveling camera heads, such as camera head 110 of FIG. 1. As shown in FIG. 31A, the slip ring assembly may include one or more brush elements 3130. In this example embodiment, two brush elements 3130 may be used as shown in further detail in FIG. 31B, with the two brush elements denoted 3130-1 and 3130-2. Brush element 3130-2 is omitted from FIG. 31A for clarity. In some embodiments, lubricant may be used on various slip ring assembly surfaces.

The brush elements 3130 may include one or more electrical contacts 3132 (in this example, three electrical contacts, 3132-1, 3132-2, and 3132-3 are shown, however, other numbers and/or shapes of the electrical contacts may be used in various embodiments) disposed on or within the brush element 3130. In an exemplary embodiment, the contacts 3132 may be electrical traces of various shapes and/or sizes on a printed circuit board substrate. Other embodiments may include contacts on a flex circuit substrate or other substrate material on which electrical contacts may be formed or etched on or attached to. The electrical contacts 3132 may include holes 3133 or other termination elements to electrically connect the contacts 3132 to wires 3134 (as shown) and/or other electrical circuit elements, such as pads on other electronic circuit elements, mechanical terminals, frictional electrical contacts, or other electrical contact mechanisms. In the example shown, three wires 3134-1, 3134-2, and 3134-3 are shown to couple the electrical contacts to other electrical circuit elements, such as output connectors on the camera head, output wires, electrical circuit components such as integrated circuits, active or passive electronic components, and the like.

The cylindrical electrical ring assembly 3110 may include corresponding electrical contacts 3112 (in this example, 3112-1, 3112-2, 3112-3) which may be electrically connected to wires 3114 (e.g., to corresponding wires 3114-1, 3114-2, and 3114-3) or other electrical connections. The electrical contacts 3112 are positioned to be in electrical contact with corresponding electrical contacts 3132 on the brush elements to maintain electrical connectivity during rotation of the ring assembly 3110, relative to the brush assembly and brush elements 3130, about rotational axis 3113. The brush elements may be flexible or bendable to continuously maintain the electrical contacts between the brush elements and cylindrical ring assembly during rotation of the ring assembly 3110 via a "squeezing action" of the brush elements on the ring assembly.

Figure 31B:
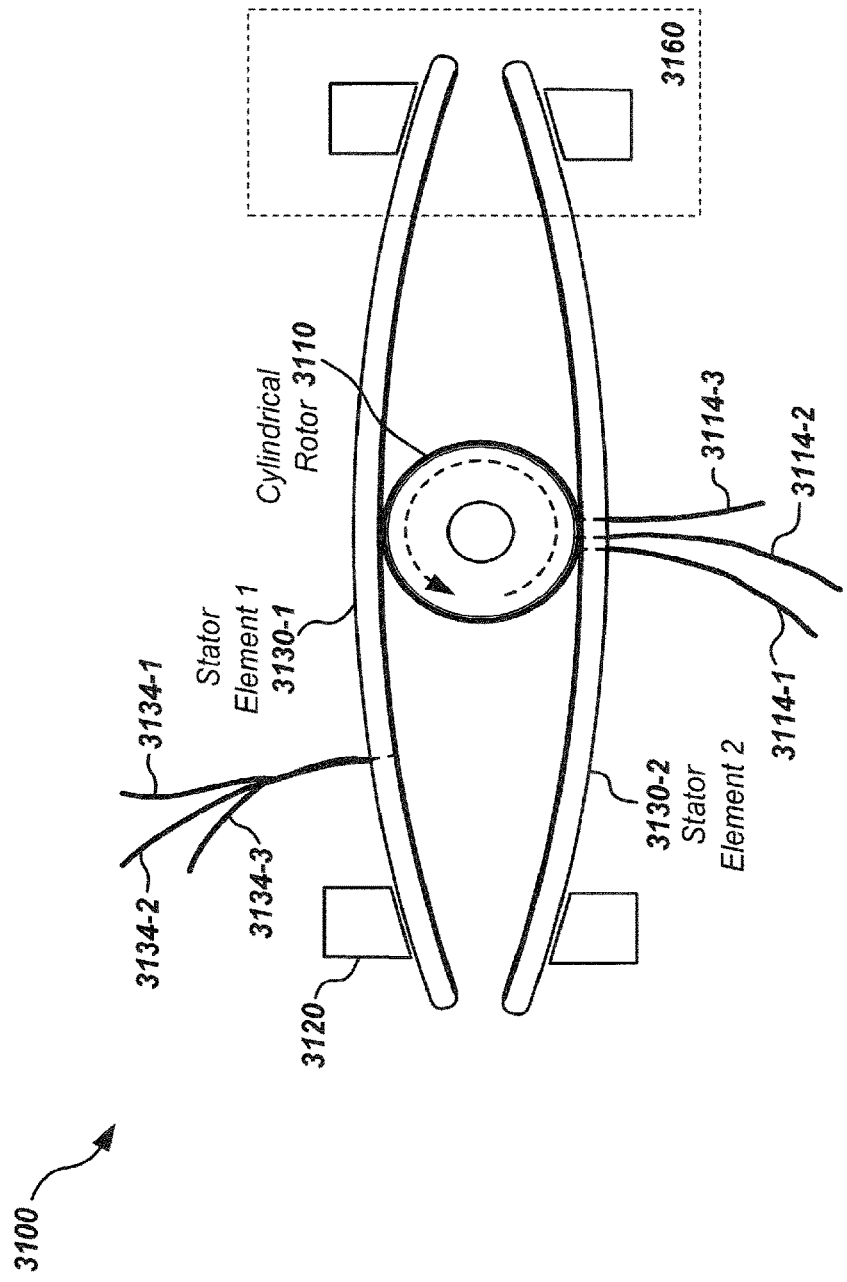
FIG. 31B illustrates details of the slip ring assembly embodiment of FIG. 31A from a top view.

FIG. 31B illustrates additional details of the slip ring embodiment of FIG. 31A from a top view. As shown in FIG. 31B, the brush element 3130-1 and 3130-2 may be fixed at or near the end areas 3160, such as via pins, block 3120 (as shown), straps, screws, brackets, or other mechanical attachment mechanisms. By bending or flexing the brush elements 3130 around the cylindrical ring assembly 3110, a squeezing action may apply tension between the brush assembly and ring assembly to maintain the electrical contacts when the ring assembly is rotated. Electrical outputs from the brush elements and ring assembly may be coupled to wires (e.g., wires 3134 and/or 3114) or to other electrical connection types, such as circuit board pads, electrical or electronic circuit components, and the like.

Figure 32:
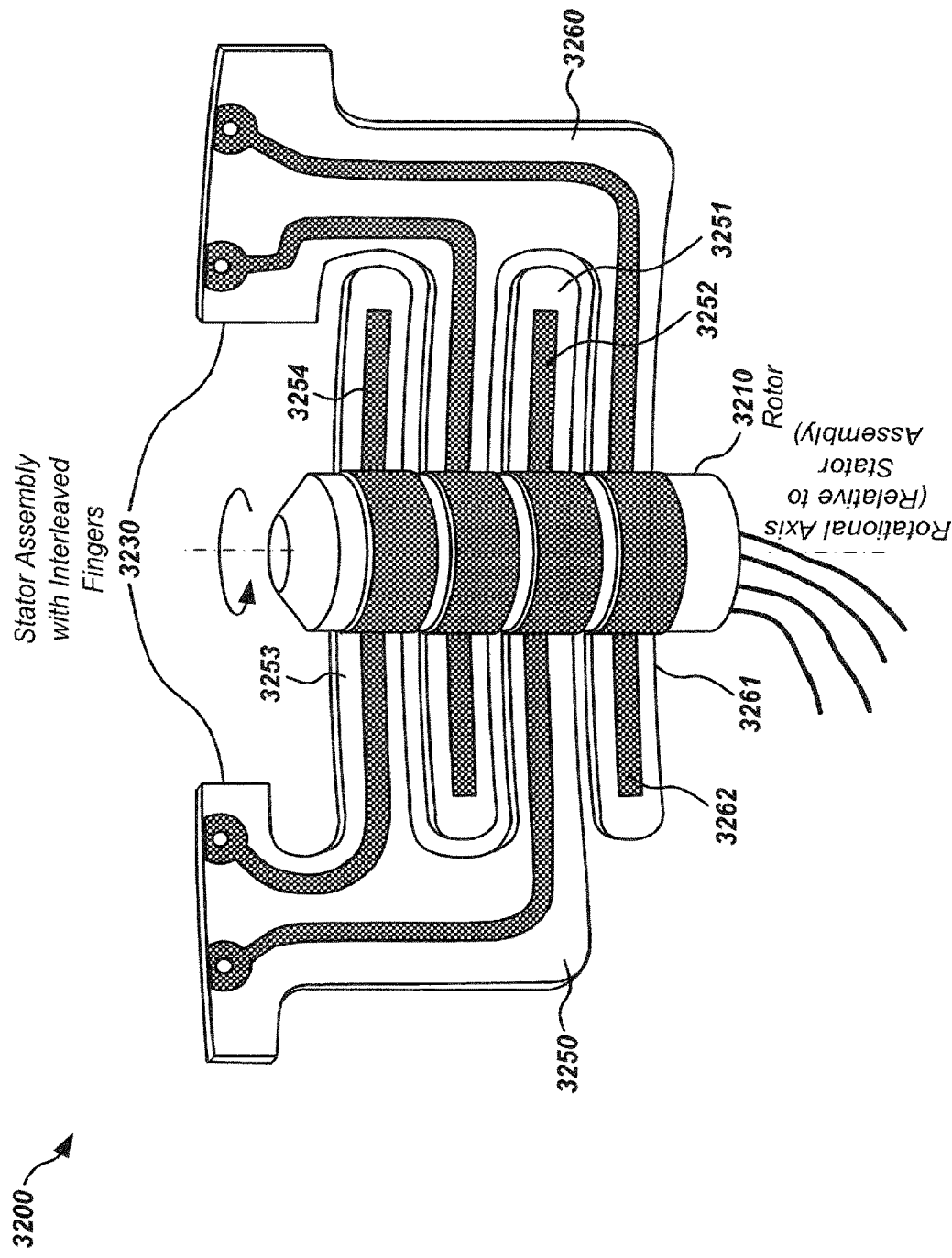
FIG. 32 illustrates details of another embodiment of a slip ring assembly in accordance with certain aspects, including a brush element with multiple interweaved tines or fingers.

FIG. 32 illustrates details of another embodiment of the core elements of a slip ring assembly wherein a brush assembly 3230 including two brush elements 3250 and 3260 include interleaved tines or fingers 3251 and 3253, with corresponding electrical contacts 3252, 3254 on the fingers. Various combinations of fingers and contacts may be used in various embodiments so as to provide electrical connections between the brush elements and electrical contacts of the corresponding ring assembly 3210 during rotation of the ring assembly 3210 about a rotational axis (relative to the brush assembly).

Figure 2:
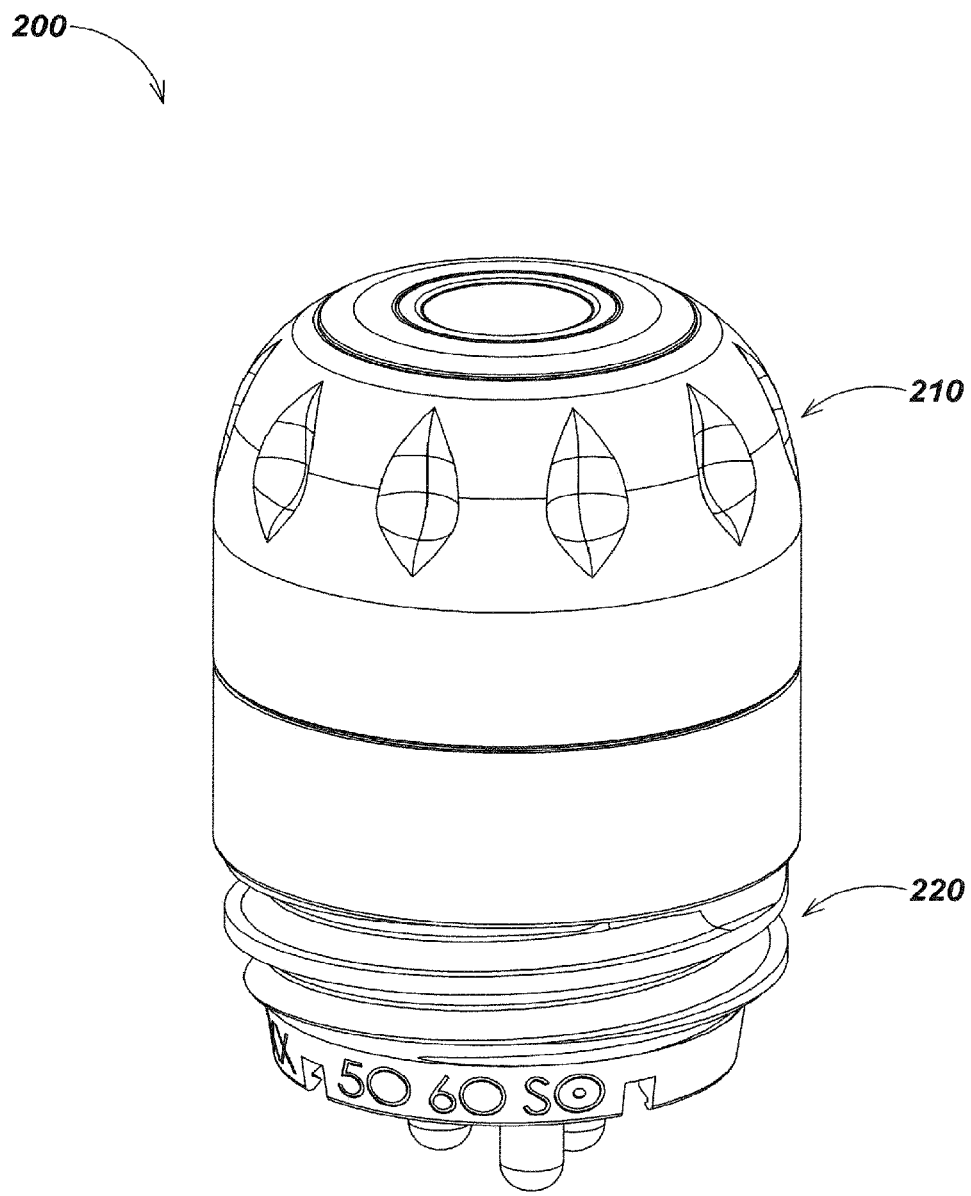
FIG. 2 is a top down isometric view of an embodiment of an enhanced self-leveling camera head.
Figure 3:
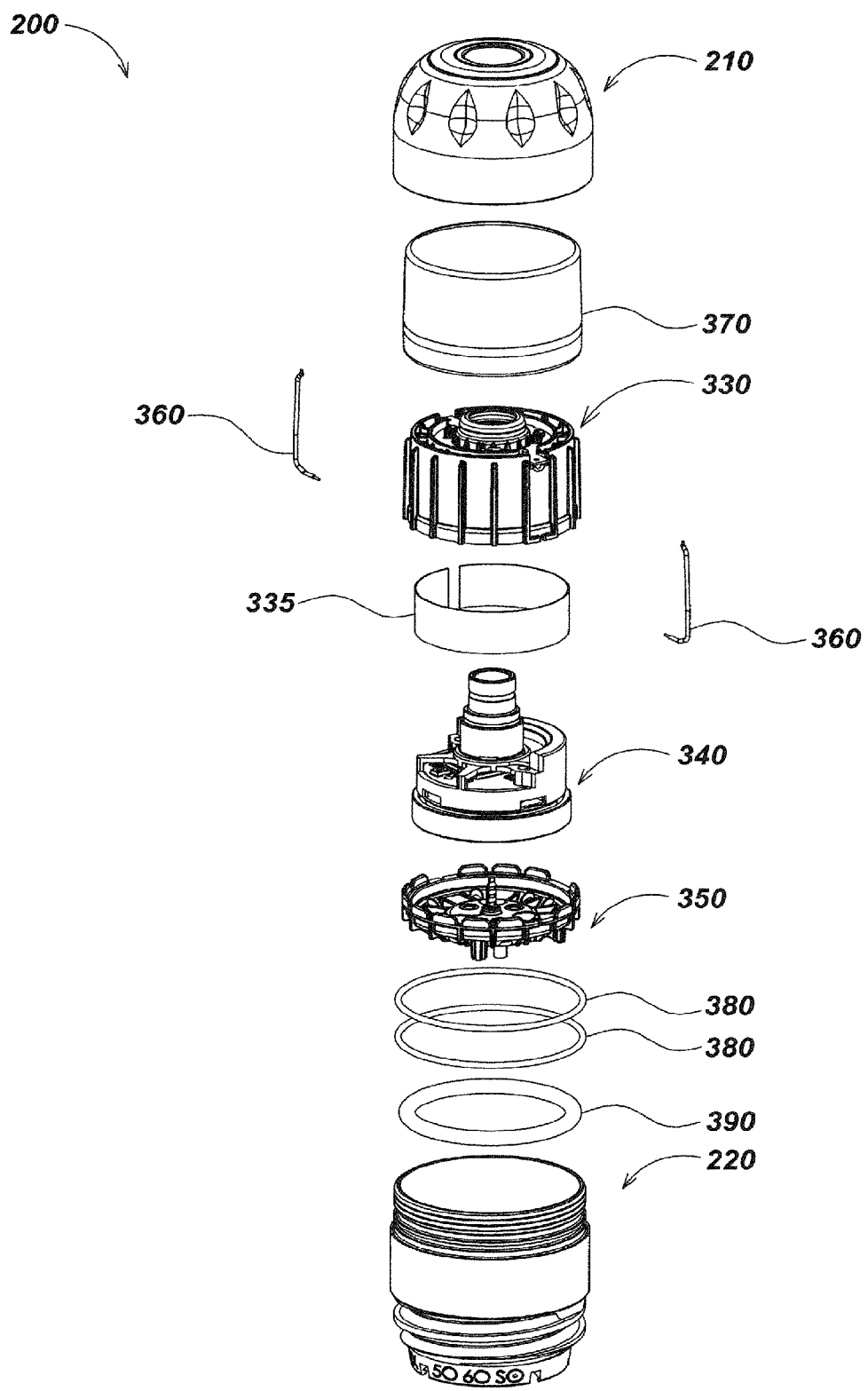
FIG. 3 is a top down exploded view of details of the camera head embodiment of FIG. 2.
Figure 4:
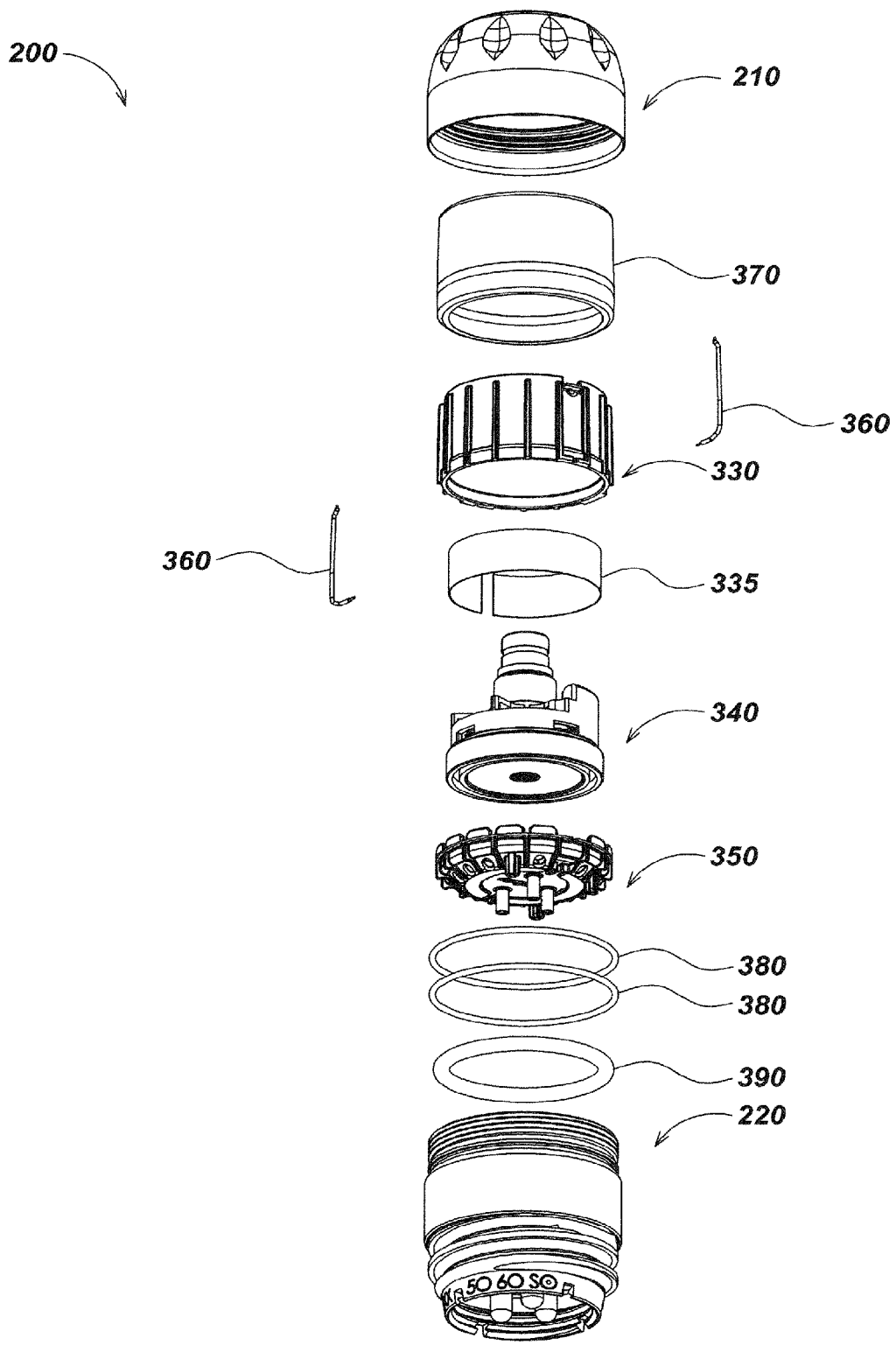
FIG. 4 is a bottom up exploded view of details of the camera head embodiment of FIG. 2.

Attention is now directed to FIGS. 2-4, which illustrate details of an exemplary embodiment of a self leveling camera head including a slip ring assembly having a cylindrical ring assembly and corresponding brush assembly, in accordance with certain aspects. As shown in FIGS. 2-4, camera head embodiment 200, which may correspond with camera head 110 of FIG. 1, may include a front housing assembly 210 and a rear housing assembly 220. In operation, an imaging sensor of the camera head may rotate relative to other elements of the camera head, such as the housing or other outer assembly, to provide self leveling. This may be done by using an asymmetric weighting element within the camera head to allow gravity to orient the sensor in an upright position irrespective of the position of the housing and/or coupled push-cable.

As best illustrated in FIGS. 3 and 4, the camera head embodiment 200 may include a front self-leveling inner case 330, a central self-leveling module 340, and a rear self-leveling inner case 350. The camera head embodiment 200 may also include an optional debris trap such as the debris tape trap 335. In assembly, the central self-leveling module 340 may be configured to largely rotate freely in respect to the front self-leveling inner case 330 and the rear self-leveling inner case 350. Wires 360 may electrically couple electrical components mounted onto the front self-leveling inner case 330 and the rear self-leveling inner case 350. A shrink film cover 370 may be made to secure about the front self-leveling inner case 330, central self-leveling module 340 (which may include a brush assembly as described herein), rear self-leveling inner case 350 (which may include a cylindrical ring assembly as described herein), and wires 360 thus aiding in securing these components together. In assembly, a series of housing O-rings 380 may be made to be seated between the front housing assembly 210 and the rear housing assembly 220 providing a water-tight seal and protect internal components. Furthermore, a rear self-leveling module O-ring 390 may be seated underneath the rear self-leveling inner case 350.

The debris tape trap 335 may be secured within self-leveling inner case 330 so as not to interfere with movements of other internal components. The debris tape trap may scavenge dirt and debris and aid in preventing premature failure or unwanted electrical noise. Grease may also be applied to surfaces, such as the bottom surface of the rear counterweight piece 1160 of FIG. 11, to act in a similar manner. In alternative embodiments, grease and/or other adhesive trap material may be used in numerous locations throughout the device to prevent unwanted dirt and debris from interfering with internally components.

Figure 5:
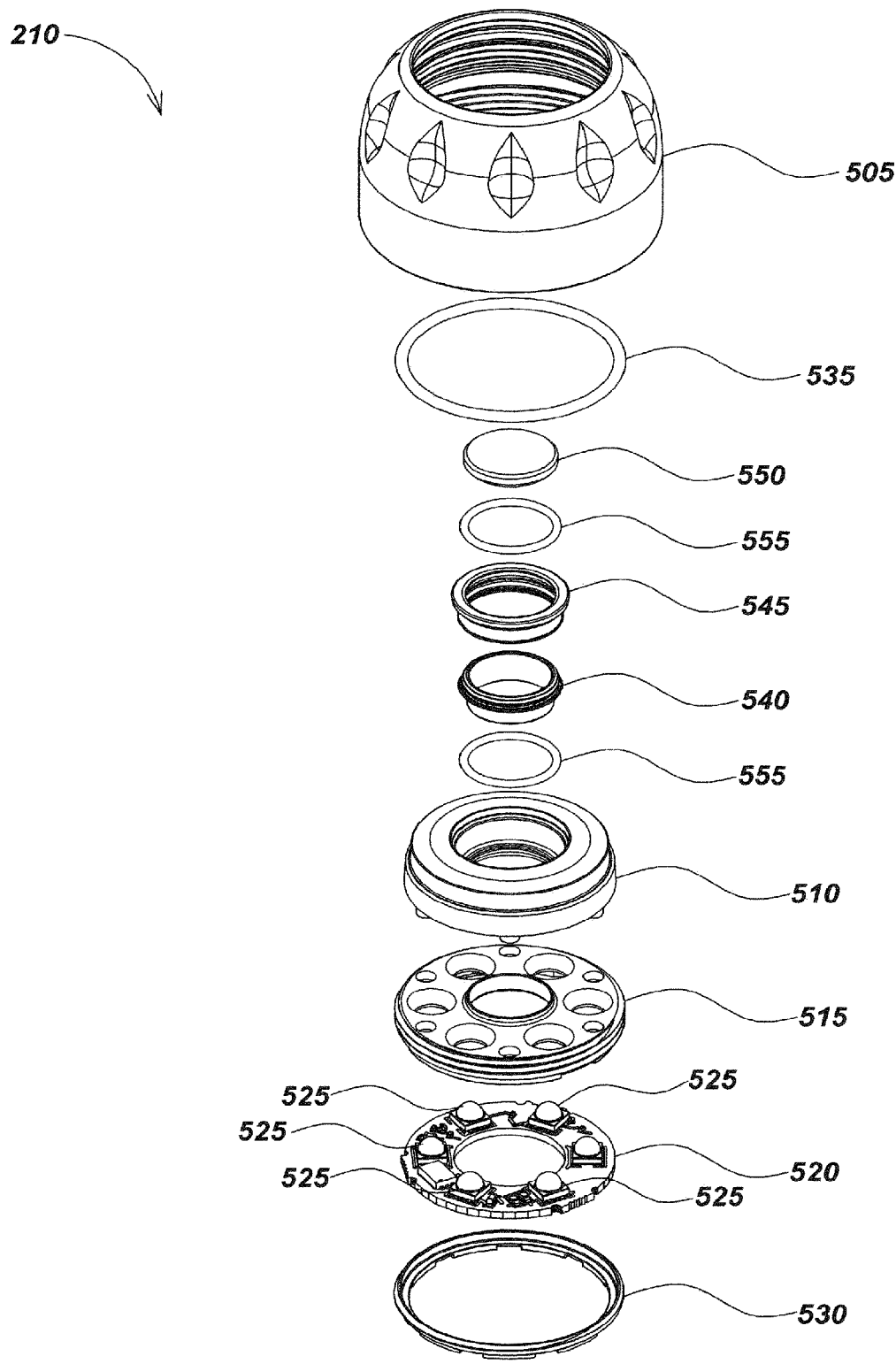
FIG. 5 is a top down exploded view of details of a front housing assembly embodiment.
Figure 6:
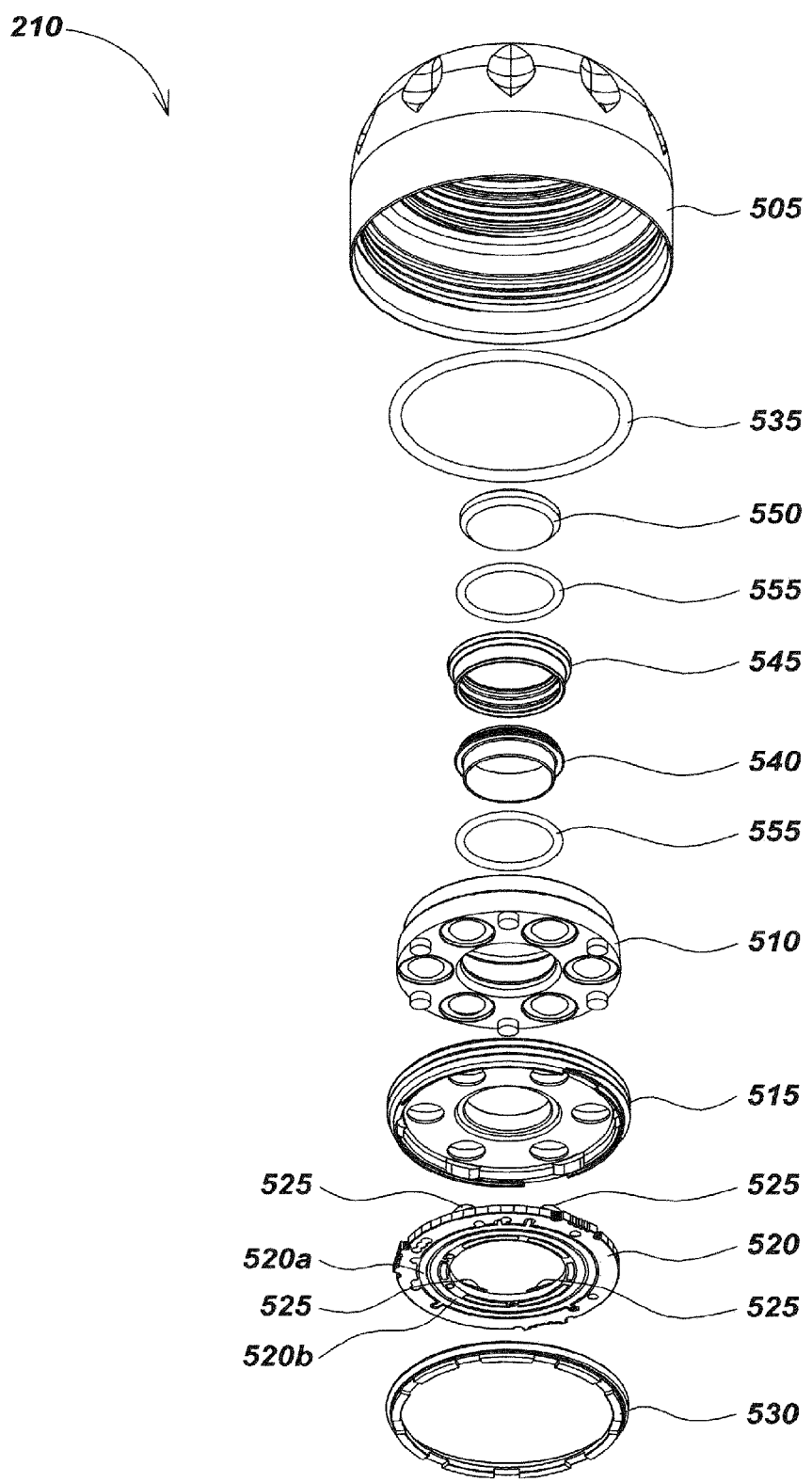
FIG. 6 is a bottom up exploded view of details of the housing assembly embodiment of FIG. 5.

Turning to FIGS. 5-6, the front housing assembly 210 may include a front bezel piece 505 which is largely dome shaped with a hole formed centrally within the dome. The front housing assembly 210 may, in part, further include a transparent illumination window 510, an LED reflector 515, a light module PCB 520 with several light emitting diodes or LEDs 525 and contact traces, such as the inner trace 520a and outer trace 520b, and a retaining ring 530. The illumination window 510, LED reflector 515, light module PCB 520 and retaining ring 530 may all be largely toroidal in shape and dimensioned to secure within the top opening of the front bezel piece 505 via threads on the LED reflector 515 mating with threads on the on the front bezel piece 505. The illumination window 510 may comprise a material with translucent or transparent properties allowing light to pass though from powered LEDs 525 on the light module PCB 520.

In assembly, the LED reflector 515 may be positioned between the illumination window 510 and light module PCB 520. Holes formed through on the surface of the LED reflector 515 may be formed to allow each LED 525 to pass through and effectively illuminate the work area when in use. The LED reflector 515 may further be composed of or coated with reflective material allowing light from the LEDs 525 to more effectively light the work area. The retaining ring 530 may screw into place behind the light module PCB 520 securing the illumination window 510, LED reflector 515, light module PCB 520 with attached LEDs 525, and retaining ring 530 together. The retaining ring 530 may be sized to allow the electrical connection from the front self-leveling inner case 330 (FIG. 3). A large O-ring 535 may be fitted between the illumination window 510 and the front bezel piece 505 to provide a water-tight seal to internal components.

The toroidal shape of the illumination window 510 may allow for a window tube 540 to be seated within. A window retaining piece 545 and an imaging window 550 may further be secured to the window tube 540. The imaging window 550 may comprise a material with translucent or transparent properties such as sapphire allowing the internal camera of the camera head 200 (FIG. 2) a forward field of view. Between the illumination window 510 and the window tube 540 and between the window retaining piece 545 and the imaging window 550, an O-ring 555 may be seated to aid in providing a water tight seal to internal components.

Figure 7:
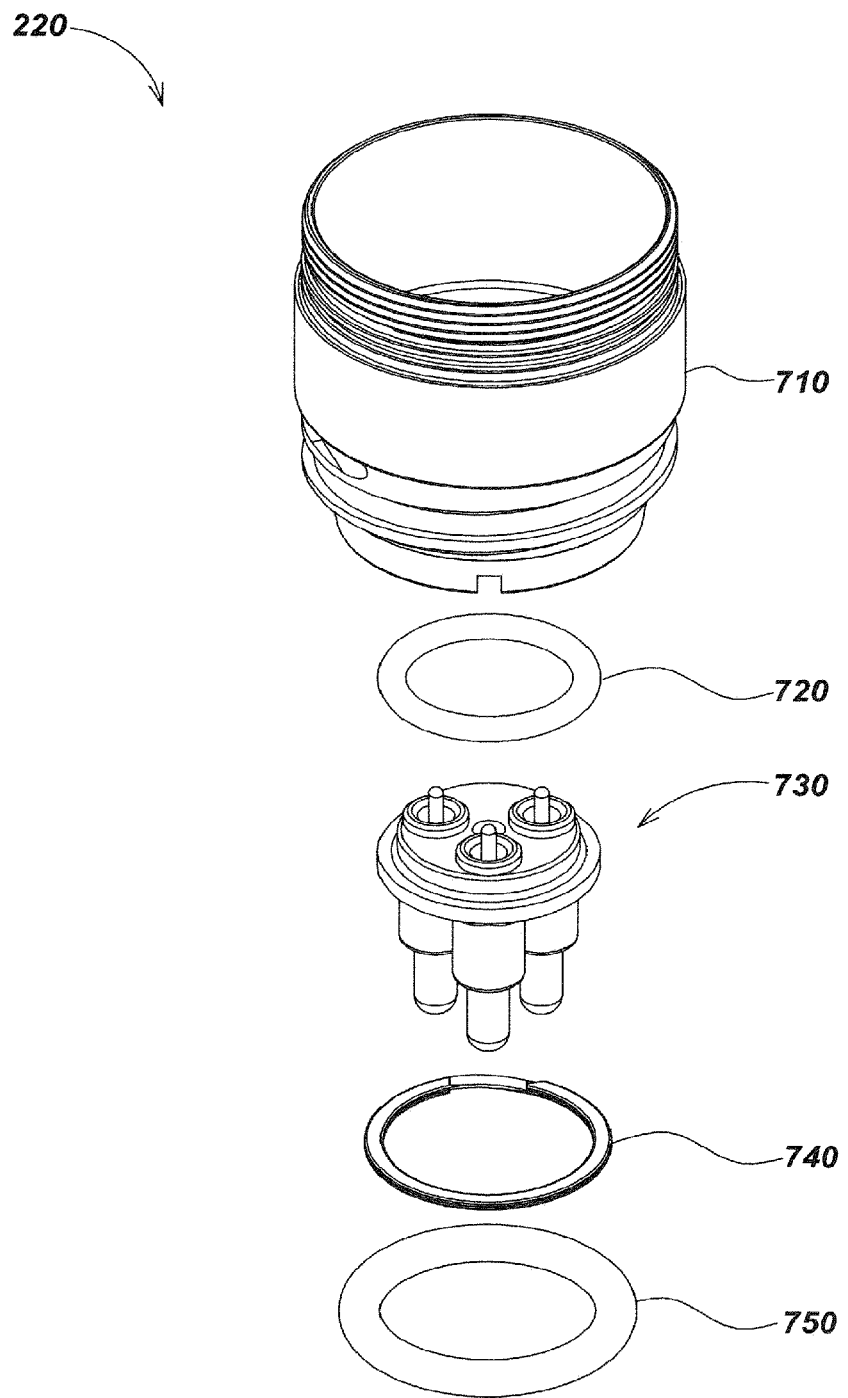
FIG. 7 is a top down exploded view of a rear housing assembly embodiment.
Figure 8:
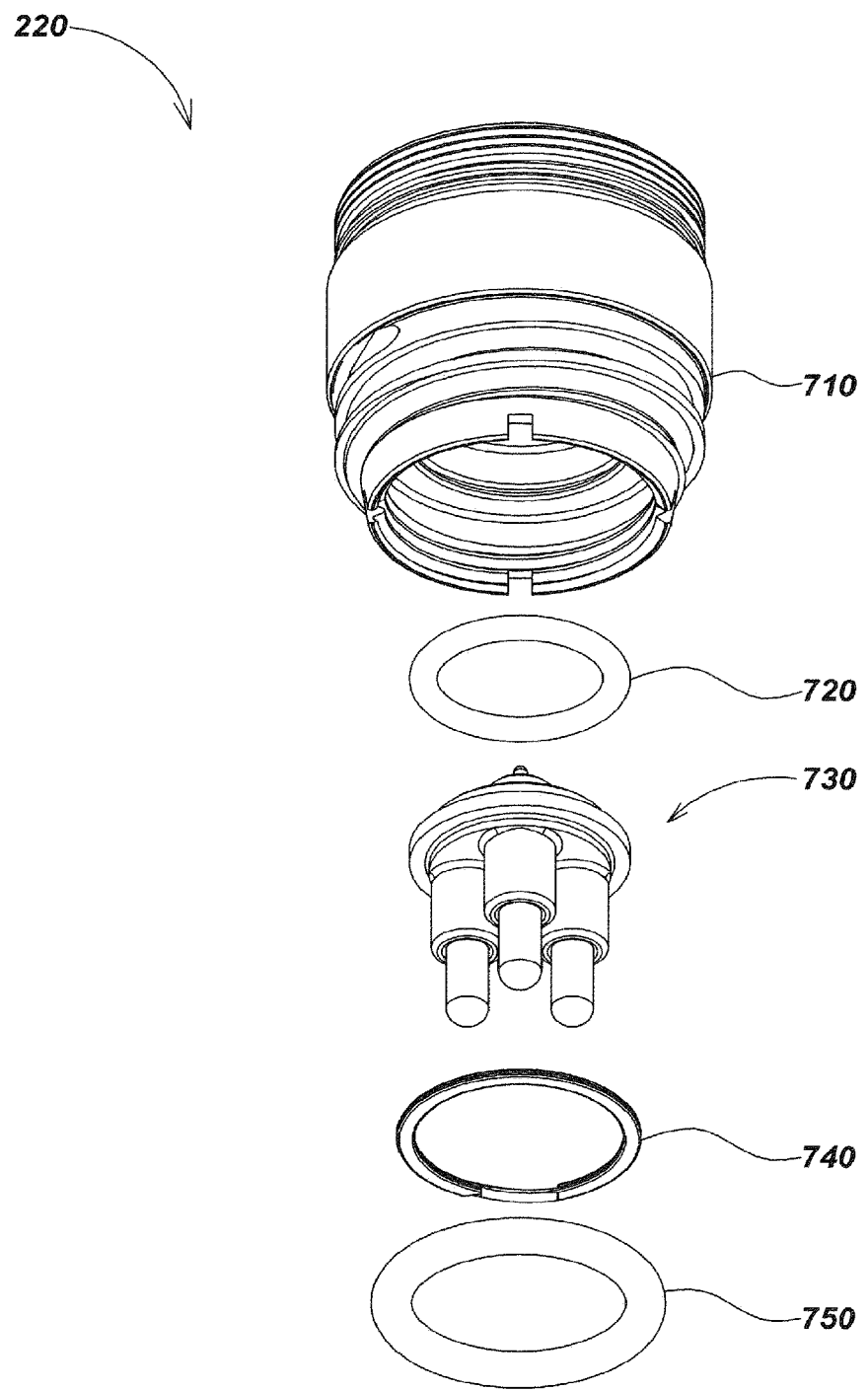
FIG. 8 is a bottom up exploded view of details of the rear housing assembly embodiment of FIG. 7.

As shown in FIGS. 7 and 8, the rear housing assembly 220 may include a rear housing element 710, which may be substantially cylindrical in an exemplary embodiment, along with a connector O-ring 720, pin connector 730, a snap ring 740, and a large connector O-ring 750. In assembly, threads formed along the top of the rear housing element 710 may be made to mate with threads formed within the front bezel piece 505 (FIG. 5) thus securing the components together.

Figure 9A:
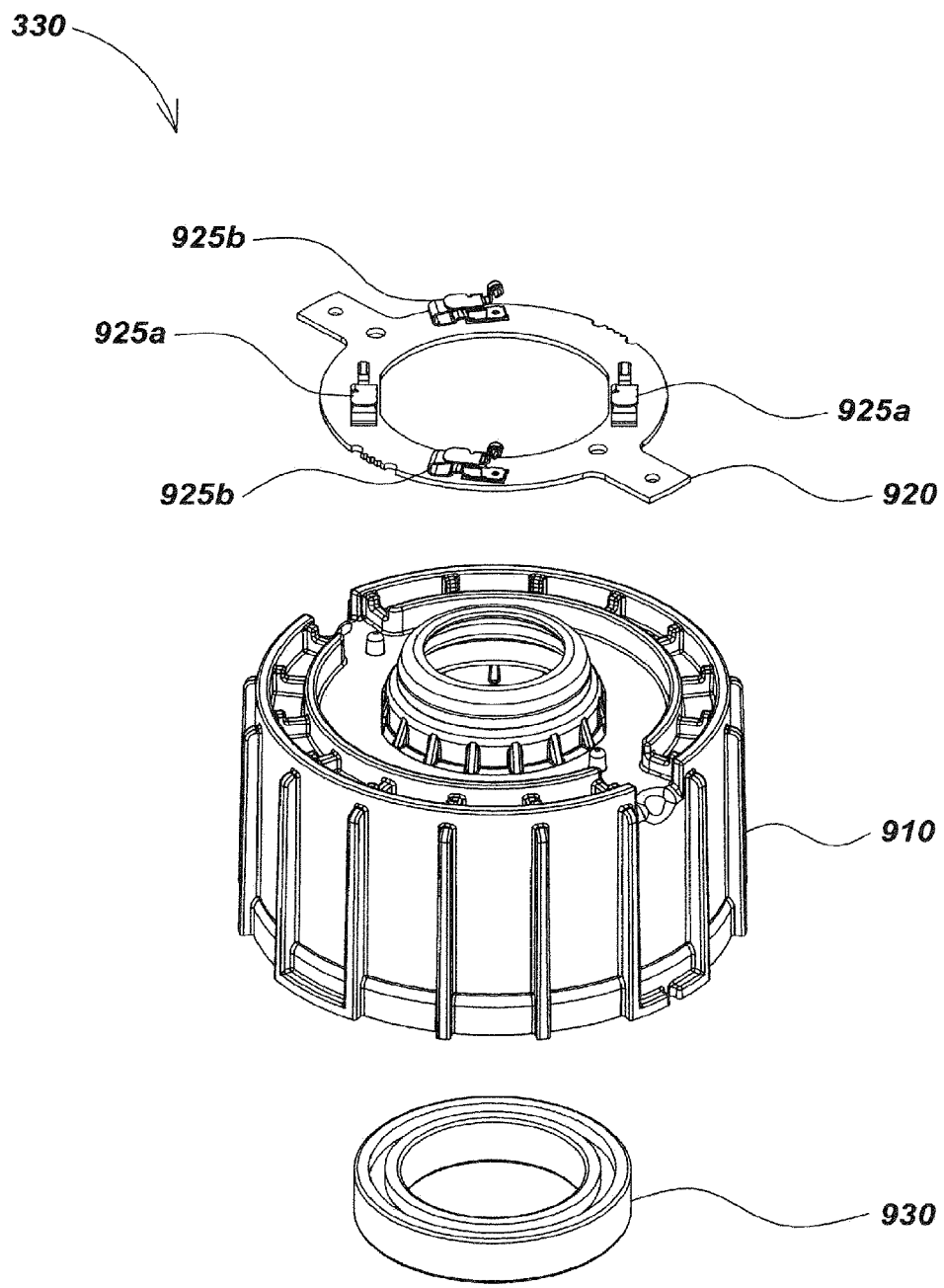
FIG. 9A is a top down exploded view of details of a front self-leveling module embodiment.
Figure 10A:
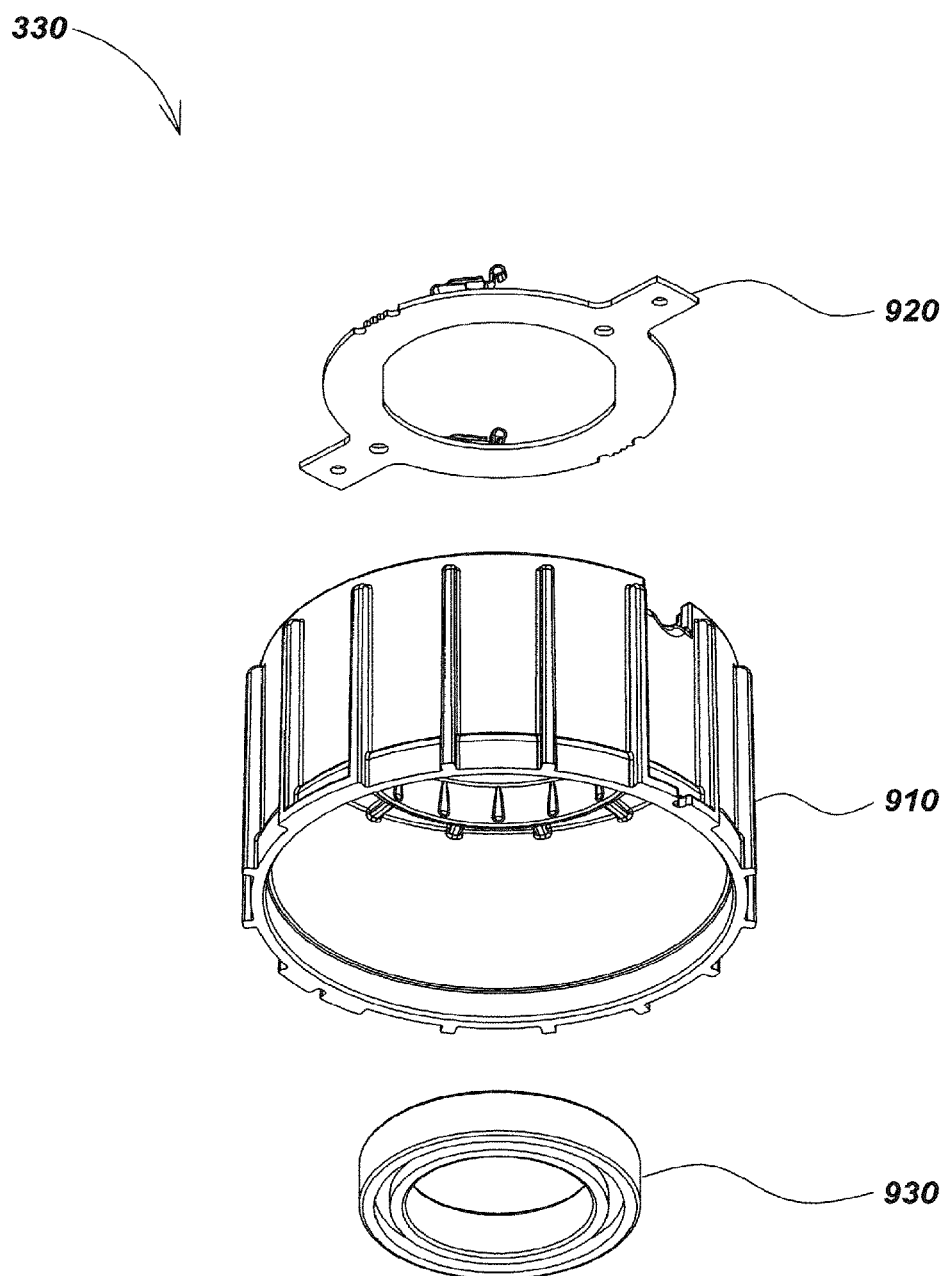
FIG. 10A is a bottom up exploded view of details of the front self-leveling module embodiment of FIG. 9A.

Turning to FIGS. 9A and 10A, the front self-leveling inner case 330 may further include a front module housing piece 910, a front module PCB 920, and a front module bearing element 930. A series of inner spring contacts 925a and outer spring contacts 925b may also be secured to the front module PCB 920. The front module housing piece 910 may be largely cylindrical in shape with a circular opening formed centrally along the top. The front module housing piece 910 may be dimension to largely accommodate the components of the central self-leveling module 340 (FIG. 3) within and may allow a lens module 1110 (FIG. 11) to fit through the top central opening. The front module PCB 920 may be annular in shape and be seated within a grooved section about the top central opening of the front module housing piece 910. The front module bearing element 930 may secure within the front module housing piece 910 and may allow the central self-leveling module 340 (FIG. 3) to rotate in respect to the front self-leveling inner case 330. The front module bearing element 930 may utilize steel or ceramic ball bearings. In some embodiments, the front module housing piece 910 may be molded or machined plastic or aluminum.

Figure 9B:
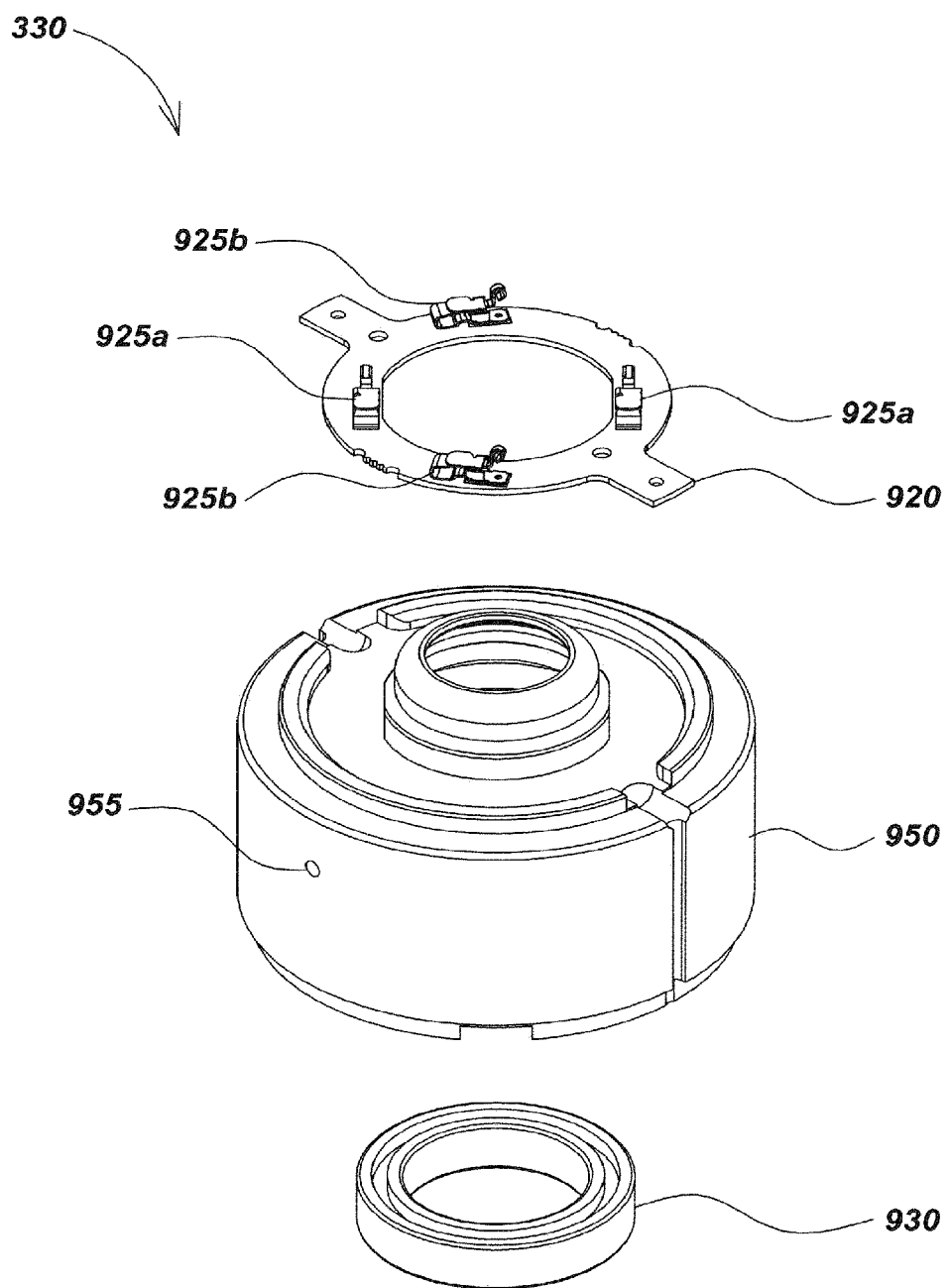
FIG. 9 B is a top down exploded view of details of an alternative front self-leveling module embodiment.
Figure 10B:
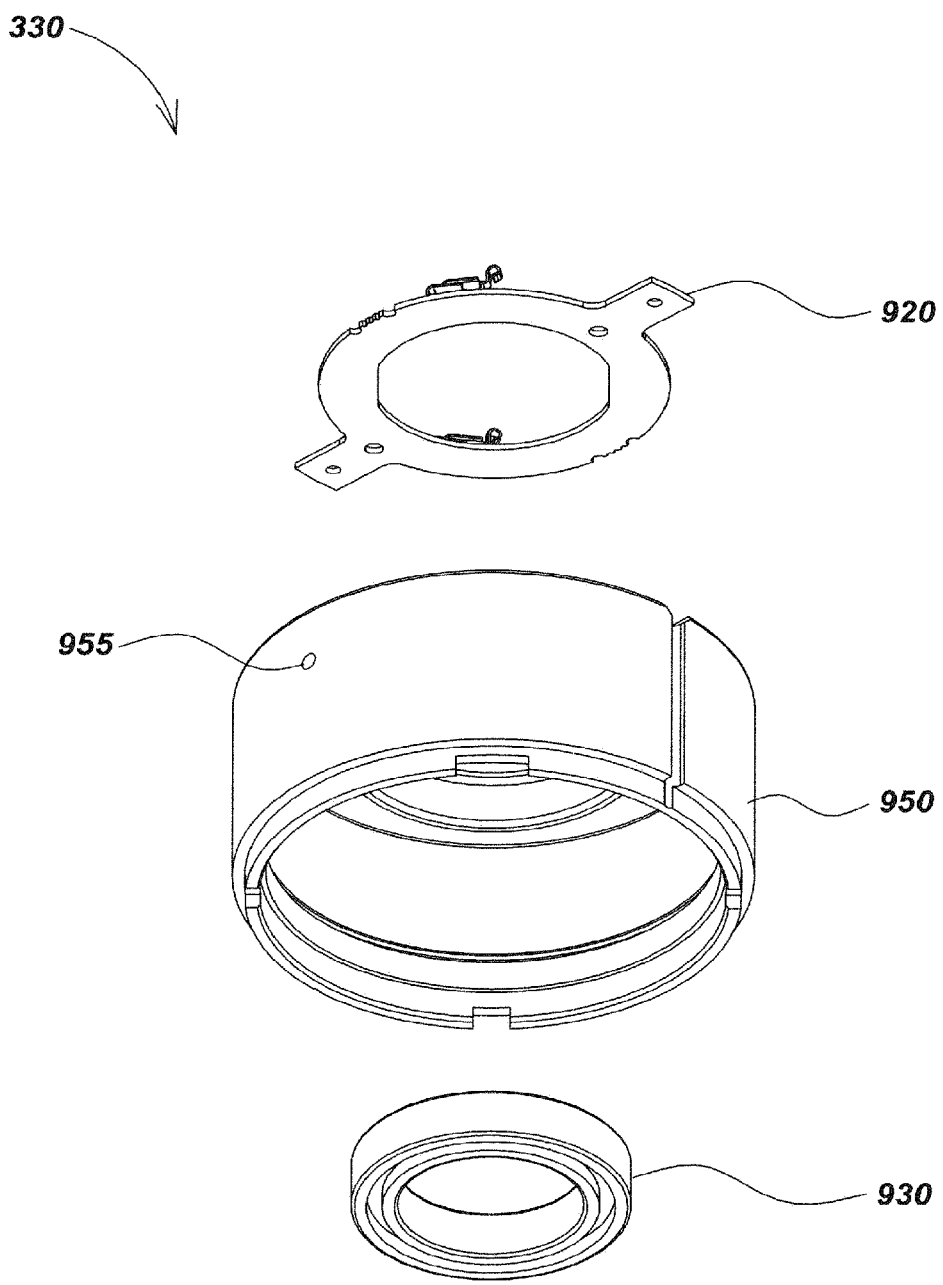
FIG. 10B is a bottom up exploded view of details of the front self-leveling module embodiment of FIG. 9B.

Turning to FIGS. 9B and 10B, an alternative front module housing embodiment 950 may include a cross hole 955. The cross hole 955 may allow a pin (not illustrated) to be inserted so as to stop the rotation and allow focusing of the lens.

Figure 11:
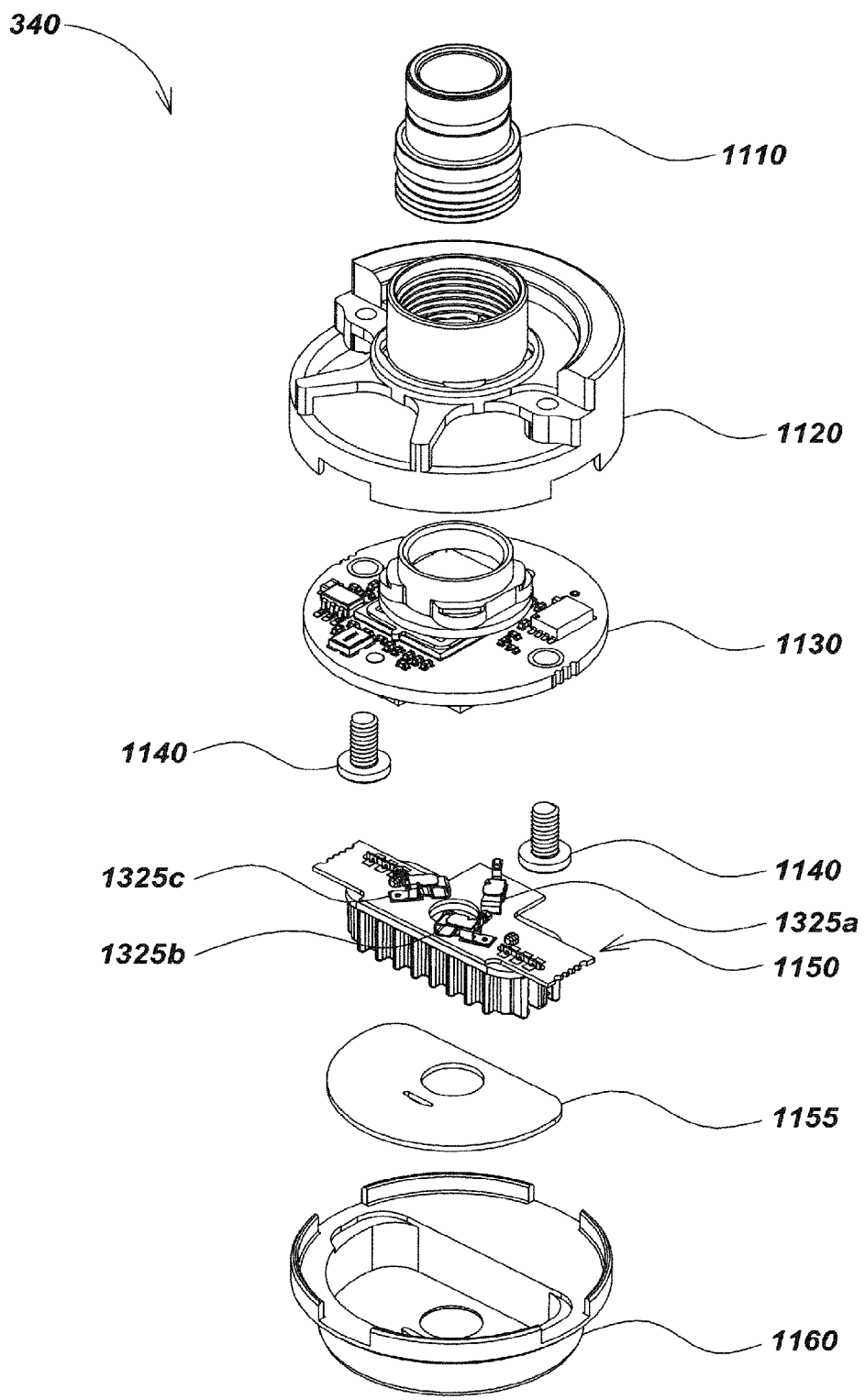
FIG. 11 is a top down exploded view of details of a central self-leveling module embodiment.
Figure 12:
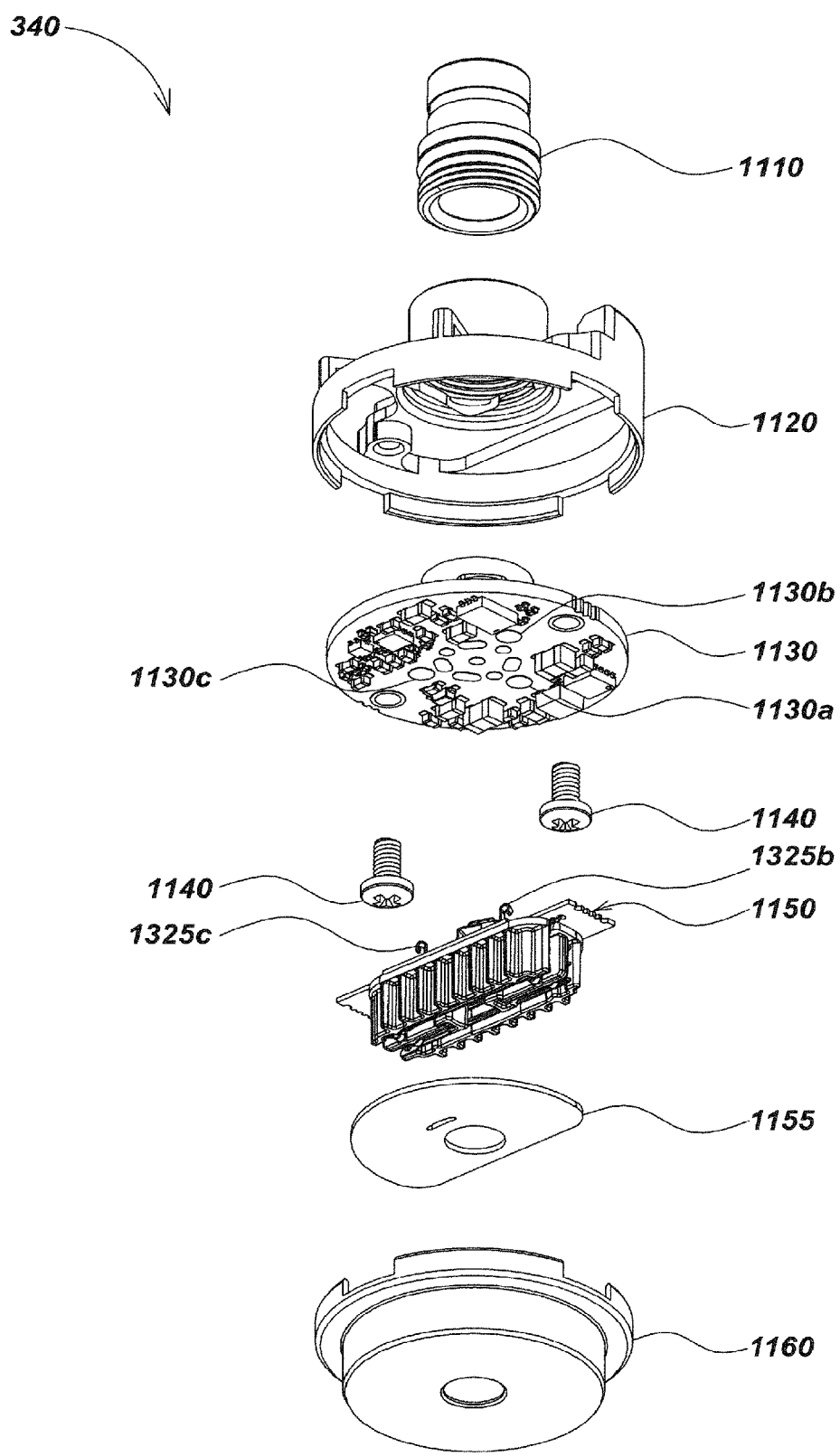
FIG. 12 is a bottom up exploded view of the central self-leveling module embodiment of FIG. 11.
Figure 13:
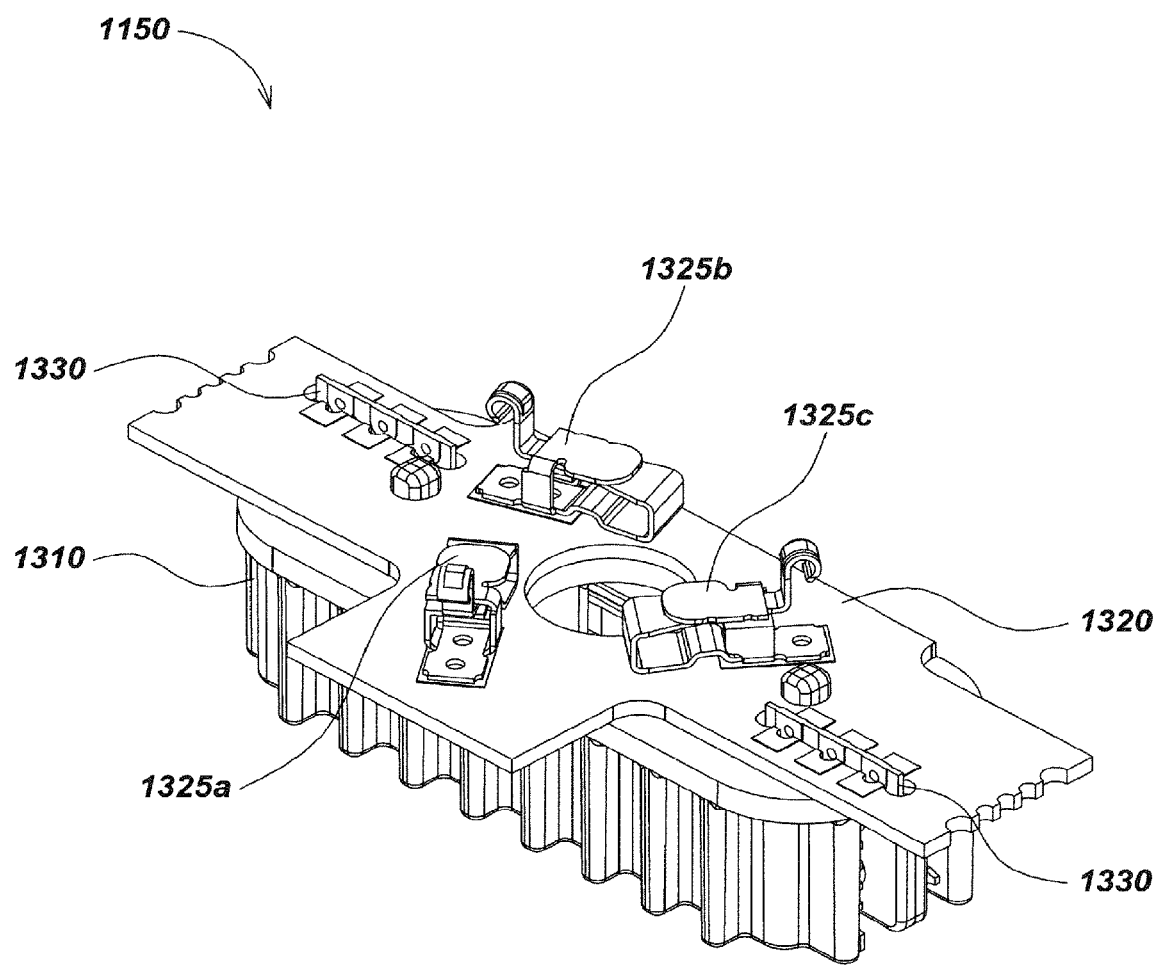
FIG. 13 an isometric view of details of an embodiment of a brush contact module.

Turning to FIGS. 11 and 12, the central self-leveling module 340 may further include a lens module 1110, a front counterweight piece 1120, an imaging module 1130, a series of screws 1140, a brush contact module 1150 (which may include a brush assembly with brush elements as described herein), desiccant paper 1155 and a rear counterweight piece 1160. The imaging module 1120 may include a series of electrical contacts such as the imaging module contact 1130a, the imaging module contact 1130b, and the imaging module contact 1130c best illustrated in FIG. 12, so as to pass electrical signals and/or power between the imaging module 1130 and the brush contact module 1150. A brush module contact 1325a, a brush module contact 1325b, and a brush module contact 1325c as best illustrated in FIG. 13 may make contact with the imaging module contact 1130a, the imaging module contact 1130b, and the imaging module contact 1130c. Threads formed along the bottom of the lens module 1110 may be made to mate with threads formed centrally about the top of the front counterweight piece 1120 to secure the lens module 1110 and the front counterweight piece 1120 together. The desiccant paper 1155 may be placed within the rear counterweight piece 1160 and below the brush contact module 1150 so as to aid in preventing corrosion and/or fogging of the lens.

The front counterweight piece 1120 may be formed with a half-circle ridge formed along one edge which may provide additional mass along one side of the central self-leveling module 340. The rear counterweight piece 1160 may be formed with a pocket along one side designed to fit a brush contact module 1310 (FIG. 13) and provide an asymmetry in mass along the same side as the front counterweight piece 1120. The front counterweight piece 1120 and the rear counterweight piece 1160 may further be composed of dense materials such as, but not limited to, steel, zinc, brass, tungsten, or filled plastics. As the central self-leveling module 340 may be made to rotate freely in respect to the front self-leveling inner case 330 (FIG. 3) and the rear self-leveling inner case 350 (FIG. 3), when in use, the asymmetry in mass along one side of the front counterweight piece 1120 and the rear counterweight piece 1160 may allow for the forces of gravity to operate as the leveling force of the camera head 200 (FIG. 2). The imaging module 1130 may secure to the front counterweight piece 1120 through the use of the screws 1140. The brush contact module 1150 may be seated within a pocket formed on the rear counterweight piece 1160. The rear counterweight piece may, in turn, secure to the bottom of the front counterweight piece 1120. The brush module contact 1325a, brush module contact 1325b, and/or brush module contact 1325c may make contact with the imaging module contact 1130a, the imaging module contact 1130*b*, and/or the imaging module contact 1130*c* so as to pass electrical signals and/or power between the imaging module 1130 and the brush contact module 1150.

Figure 14:
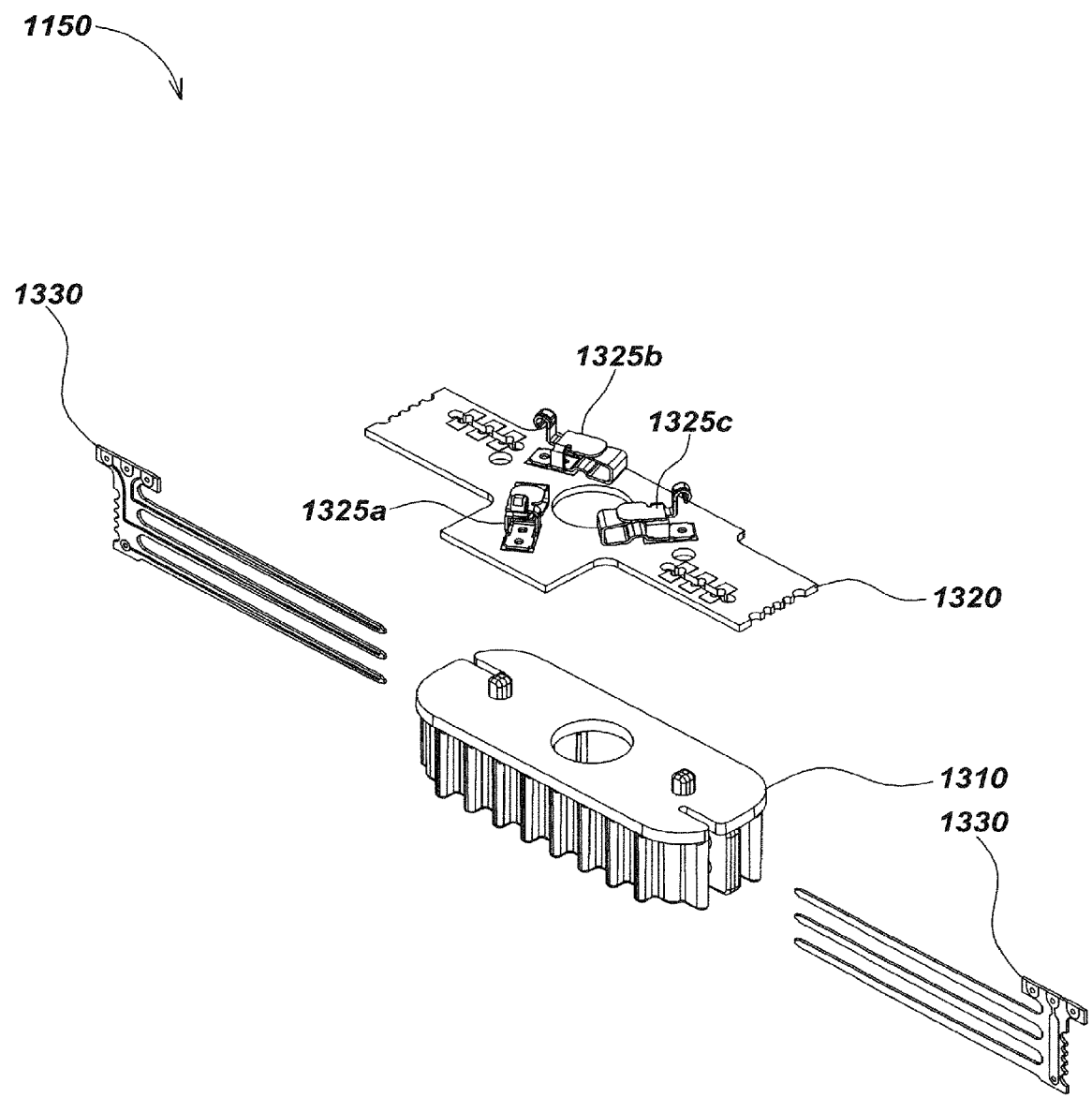
FIG. 14 is a top down exploded view of details of an embodiment of a brush contact module including brush elements having interlocking tines or fingers.
Figure 15:
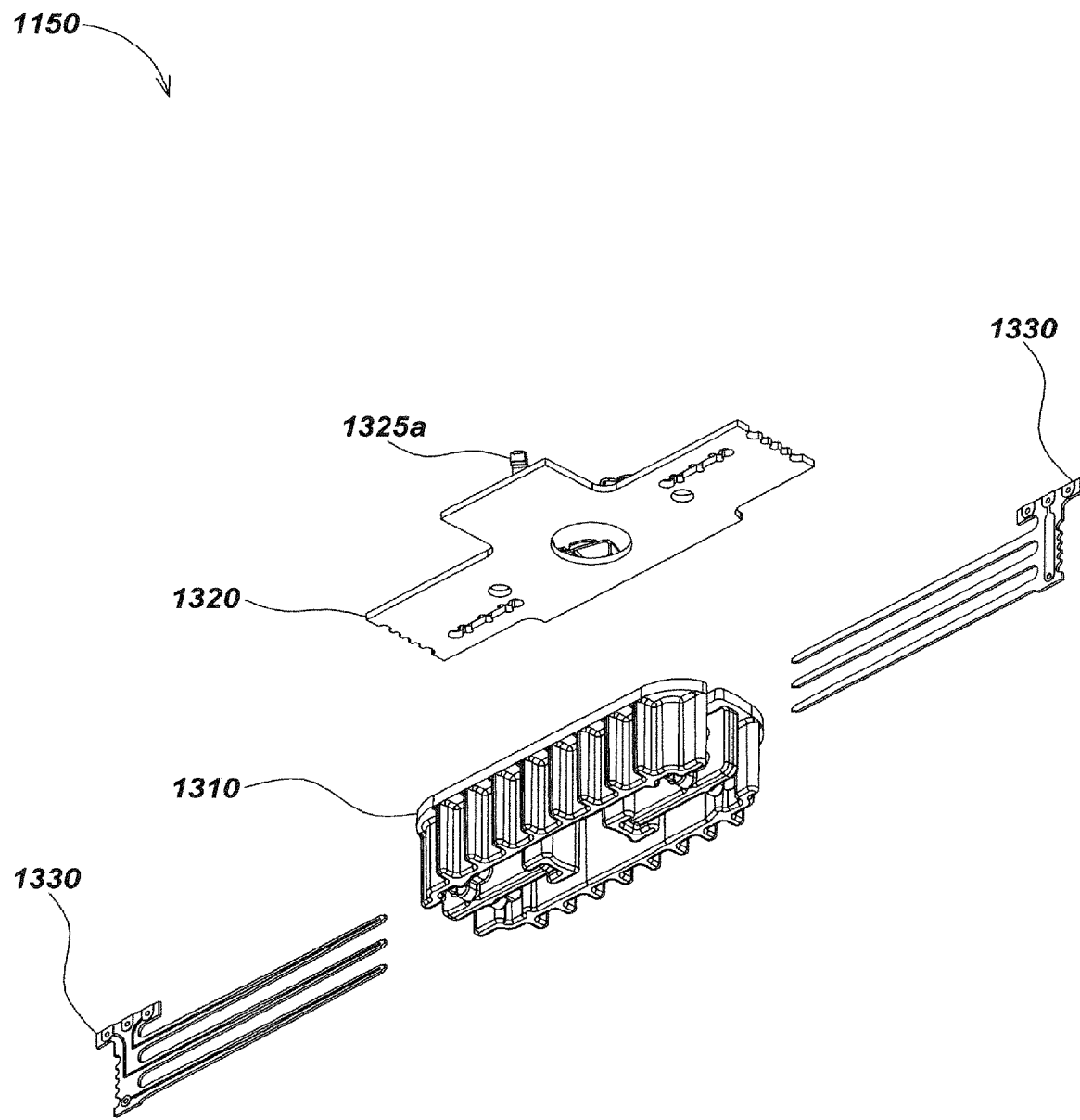
FIG. 15 is a bottom up exploded view of details of the brush contact module embodiment of FIG. 14.

As shown in detail in FIGS. 13-15, the brush contact module 1150 may further include a brush cartridge 1310, a contact PCB 1320, and a series of brush elements, in the form of flexible PCB brushes 1330. The brush cartridge 1310 and the contact PCB 1320 may be formed with a central opening allowing components of the rear self-leveling inner case 350 (FIG. 3) to fit within. The PCB brushes 1330 may fit within grooves through the brush cartridge 1310 and make contact with components of the rear self-leveling inner case 350 (FIG. 3) so as to pass electrical signals and/or power from the rear self-leveling inner case 350 (FIG. 3) to the central self-leveling module 340 (FIG. 3).

The PCB brushes 1330 may comprise printed circuit board material or other flexible materials which may also be coated to increase hardness and increase oxide resistance, particularly on the brush electrical contacts. For instance, the PCB brushes 1330 may be coated with palladium nickel, rhodium, or hard gold or other such materials. Printed circuit board technologies and manufacturing processes may be particularly suited to the fabrication of contact brushes, such as the PCB brushes 1330, due to the variety of parameters readily customizable to fit the specific application of the contact brush. For instance, substrate thickness, substrate material, width and length of the bending elements, and shape or geometry of the contact brush are parameters which may be readily customized to fit a particular application. A contact-brush system such as that of the brush contact module 1150 may provide enhancements to the ease and cost of manufacturing self-leveling cameras such as the camera head embodiments of the present disclosure.

In this exemplary embodiment there are two PCB brushes 1330, each with three tines or fingers on the PCB brushes 1330 such that each tine may provide a separate electrical pathway. In alternative embodiments the number of tines providing electrical pathways may be changed to suit the particular application. Furthermore, in some alternative embodiments, two or more PCB brushes may be used in a brush assembly, and contacts on the two or more brushes may be redundant to further improve electrical connectivity and/or operational reliability or endurance/wear resistance. In some embodiments, the PCB brushes may be oppositely mounted to mitigate impacts and shock from lifting both contacts at the same time.

Figure 16:
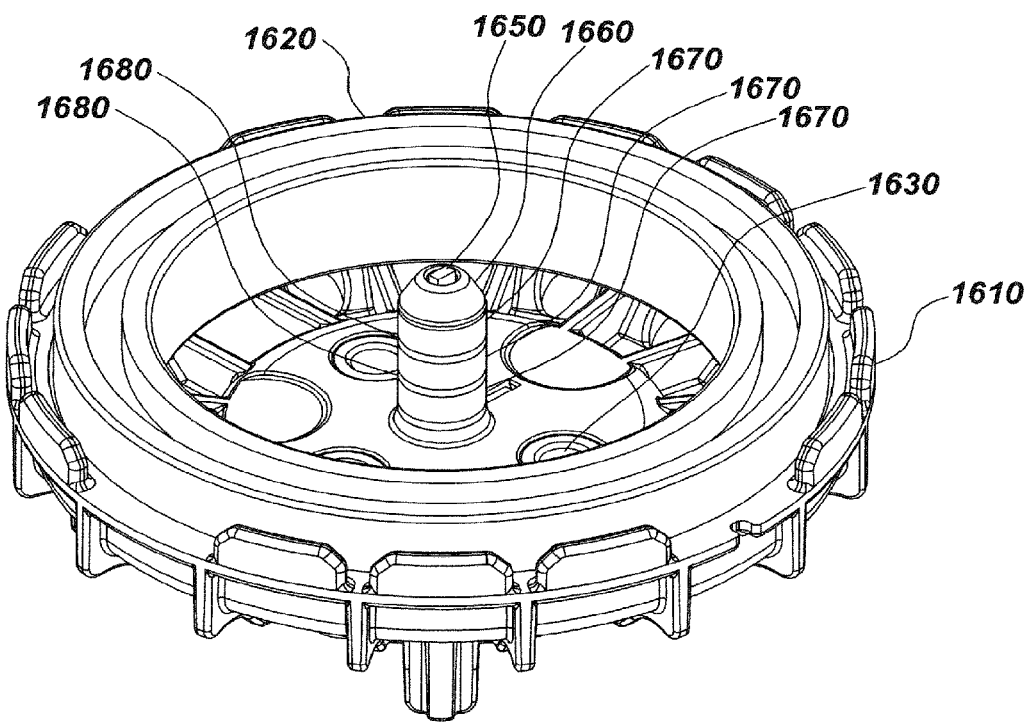
FIG. 16 is an isometric view of details of an embodiment of a rear self-leveling module including a cylindrical contact ring assembly.
Figure 17:
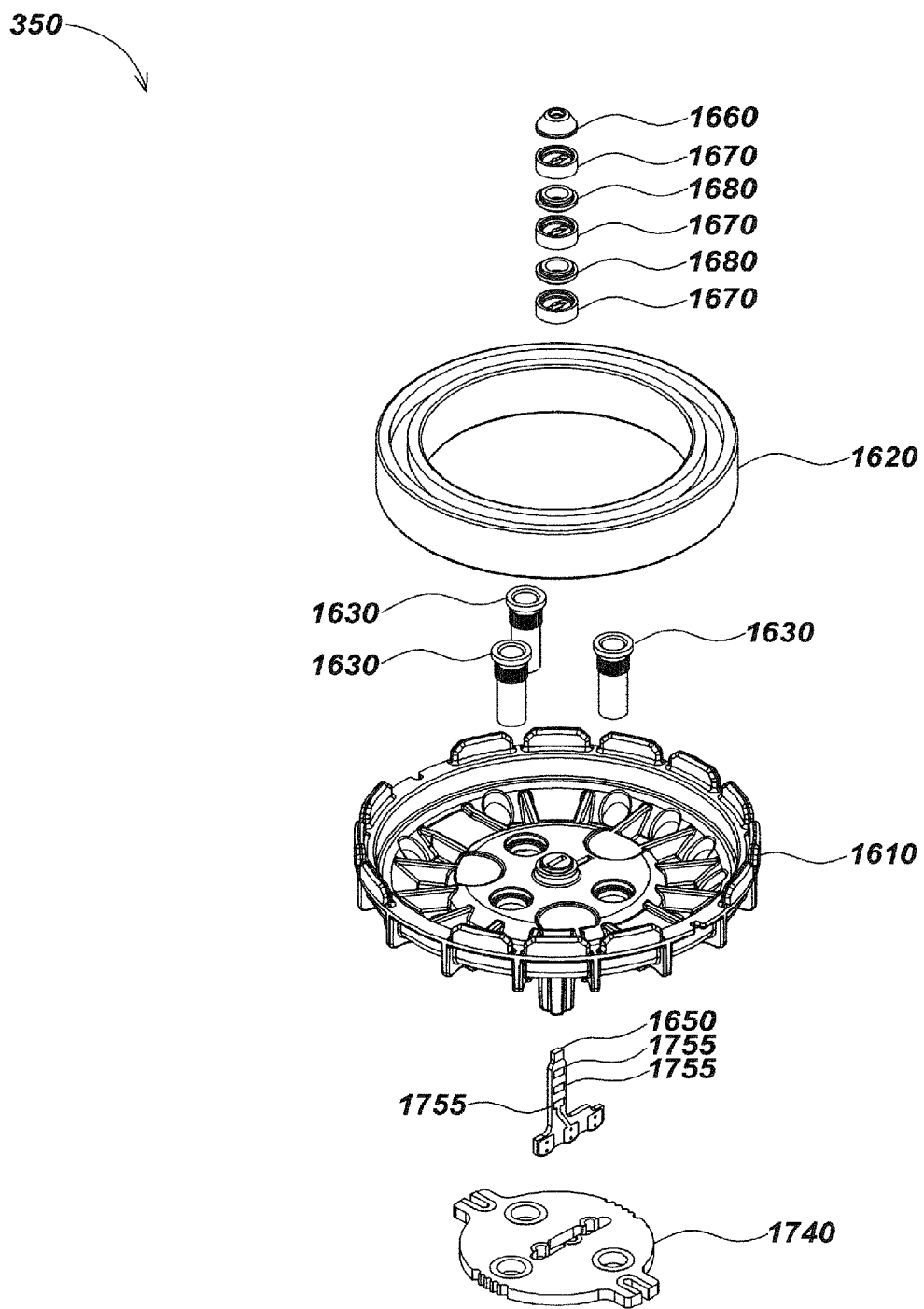
FIG. 17 is a top down exploded view details of the self-leveling module embodiment of FIG. 16.
Figure 18:
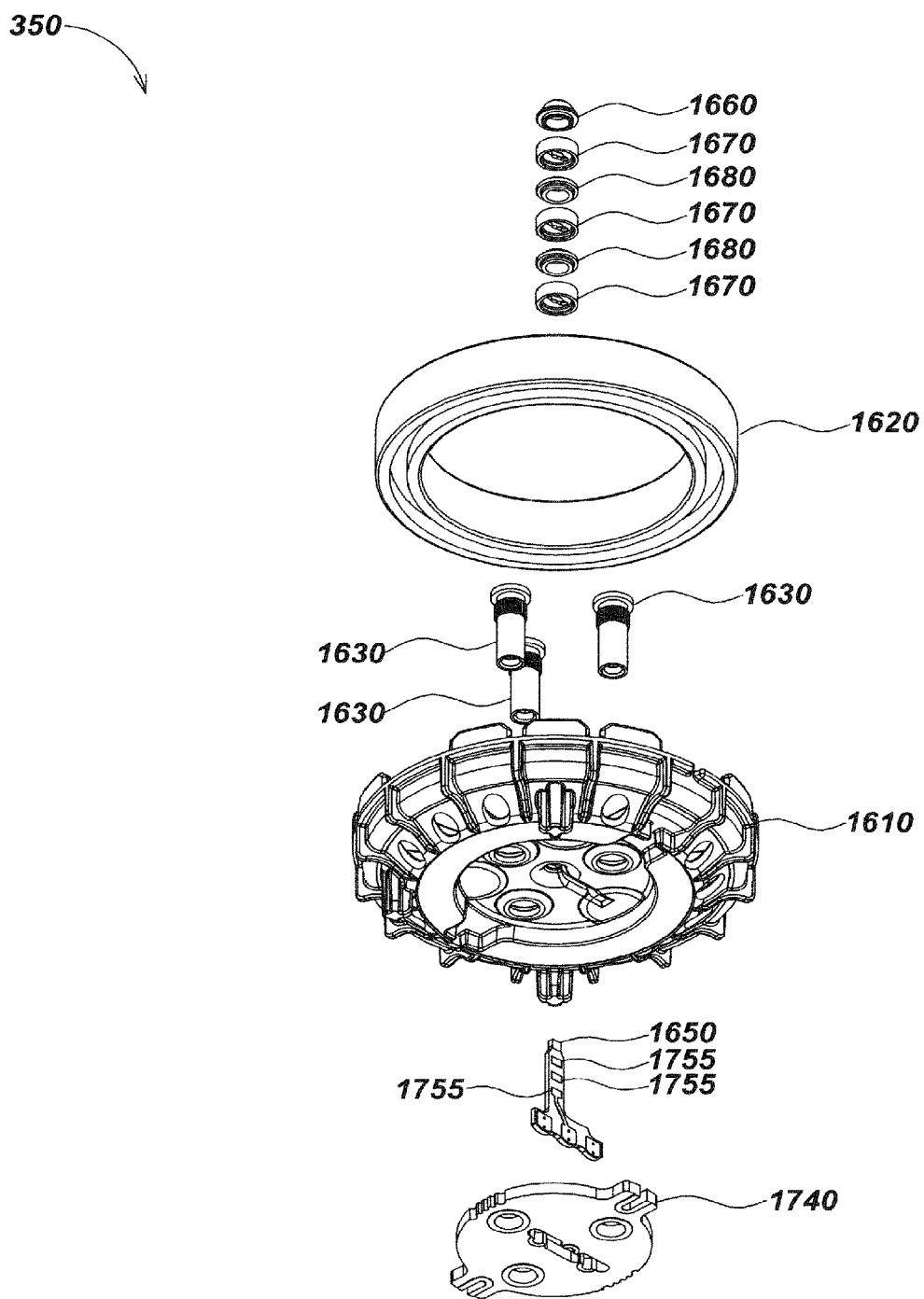
FIG. 18 is a bottom up exploded view of details of the self-leveling module embodiment FIG. 16.
Figure 19:
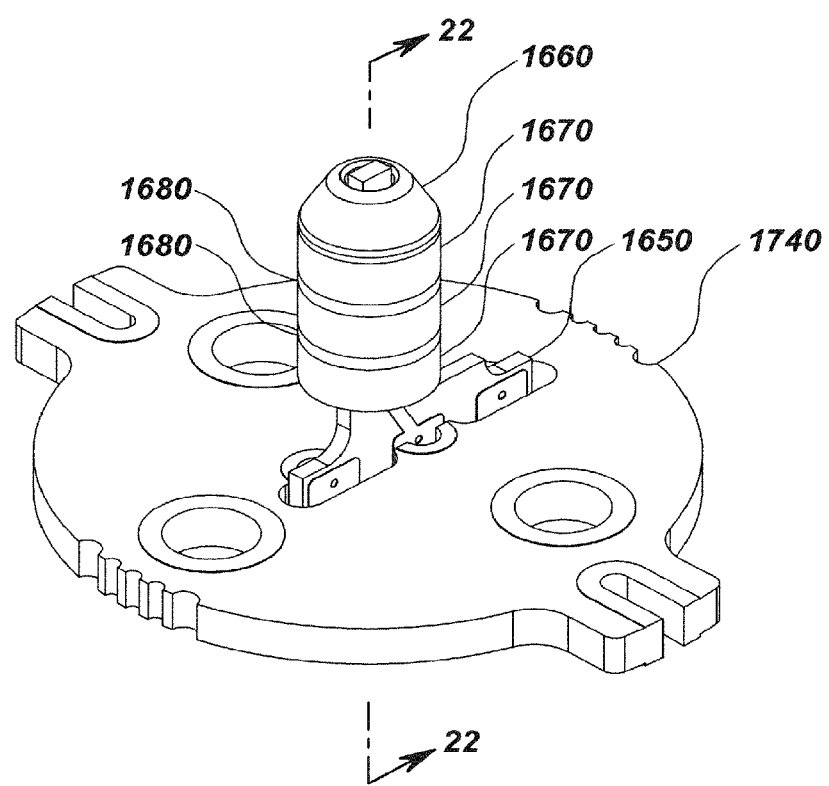
FIG. 19 an isometric view illustrating details of an embodiment of a cylindrical contact ring module.

Turning to FIGS. 16-18, the rear self-leveling inner case 350 may further include a rear module housing piece 1610, a rear bearing element 1620 which may utilize ceramic balls, a series of pin contact sockets 1630, a rear module PCB 1740 (FIGS. 17 and 18), a contact ring PCB 1650, and a cylindrical contact ring assembly including a contact guide cap 1660, a series of contact rings 1670, and a series of dielectric separator rings 1680. Electrical contact of the cylindrical contact ring assembly may be positioned in contact with corresponding electrical contacts of the brush assembly to provide continuous electrical connectivity during rotation of the cylindrical contact ring assembly relative to the brush assembly. In fabrication, the rear bearing element 1620 may be seated within the rear module housing piece 1610 such as to allow the central self-leveling module 340 (FIG. 3) to rotate freely in respect to the front self-leveling inner case 330 (FIG. 3) and the rear self-leveling inner case 350. Hand solder or solder reflow techniques may be used to connect contact rings 1670 to solder points 1755 on PCB 1650.

The pin contact sockets 1630 may be made to pass through holes formed through the rear module housing piece 1610 and the rear module PCB 1740 (FIGS. 17 and 18) so as to make contact with pin connector 730 (FIG. 7) of the rear housing assembly 220 (FIG. 7). The pin contact sockets 1630 may further make contact with contacts on the rear module PCB 1740 (FIGS. 17 and 18) creating a pathway for electrical current from the pin connector 730 (FIG. 7) of the rear housing assembly 220 (FIG. 7) to the rear self-leveling inner case 350. The contact ring PCB 1650 may be seated centrally on the rear module PCB 1740 (FIGS. 17 and 18). The contact ring assembly including guide cap 1660, contact rings 1670, and dielectric separator rings 1680 may be configured to be secured to an upward extending arm of the contact ring PCB 1650.

As best illustrated in FIGS. 19-22, a contact ring module 1900 may include a PCB and cylindrical contact ring assembly, such as rear module PCB 1740, the contact ring PCB 1650, the contact guide cap 1660, the contact rings 1670, and the dielectric separator rings 1680. The contact ring PCB 1650 may be seated centrally within the rear module PCB 1740 along a plane perpendicular to that of the rear module PCB 1740. Electrical pathways may be formed between the rear module PCB 1740 and the contact ring PCB 1650 that extend internally within the contact ring PCB 1650. The internal electrical pathways of the contact ring PCB 1650 may each connect to one of a series of contact pads 1755 (FIG. 20) on the outer surface(s) of the contact ring PCB 1650.

In assembly, the contact rings 1670 and dielectric separator rings 1680 may be seated on the upward extending arm of the contact ring PCB 1650 in an alternating sequence so that each of the contact rings 1670 may be separated by one of the dielectric separator rings 1680. Electrical pathways may be formed from the rear module PCB 1740 through the contact ring PCB 1650 and to each of the contact rings 1670 creating pathways to pass from the rear housing assembly 220 (FIG. 3) through the rear self-leveling inner case 350 (FIG. 3). These electrical pathways may then pass through the brush contact module 1150 (FIG. 11) to the imaging module 1130 (FIG. 11) within the central self-leveling module 340 (FIG. 11).

Figure 20:
FIG. 20 is a top down exploded view of details of the contact ring module embodiment of FIG. 19.
Figure 20:
Figure 20:
Figure 20:
Figure 20:
Figure 20:
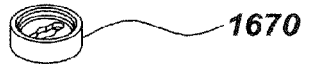
Figure 20:
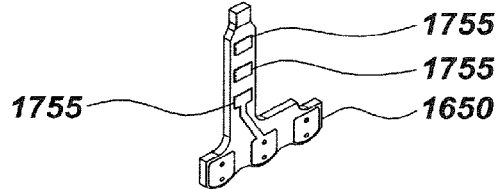
Figure 20:
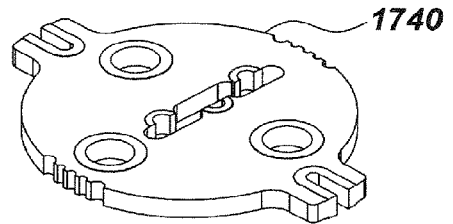
Figure 21:
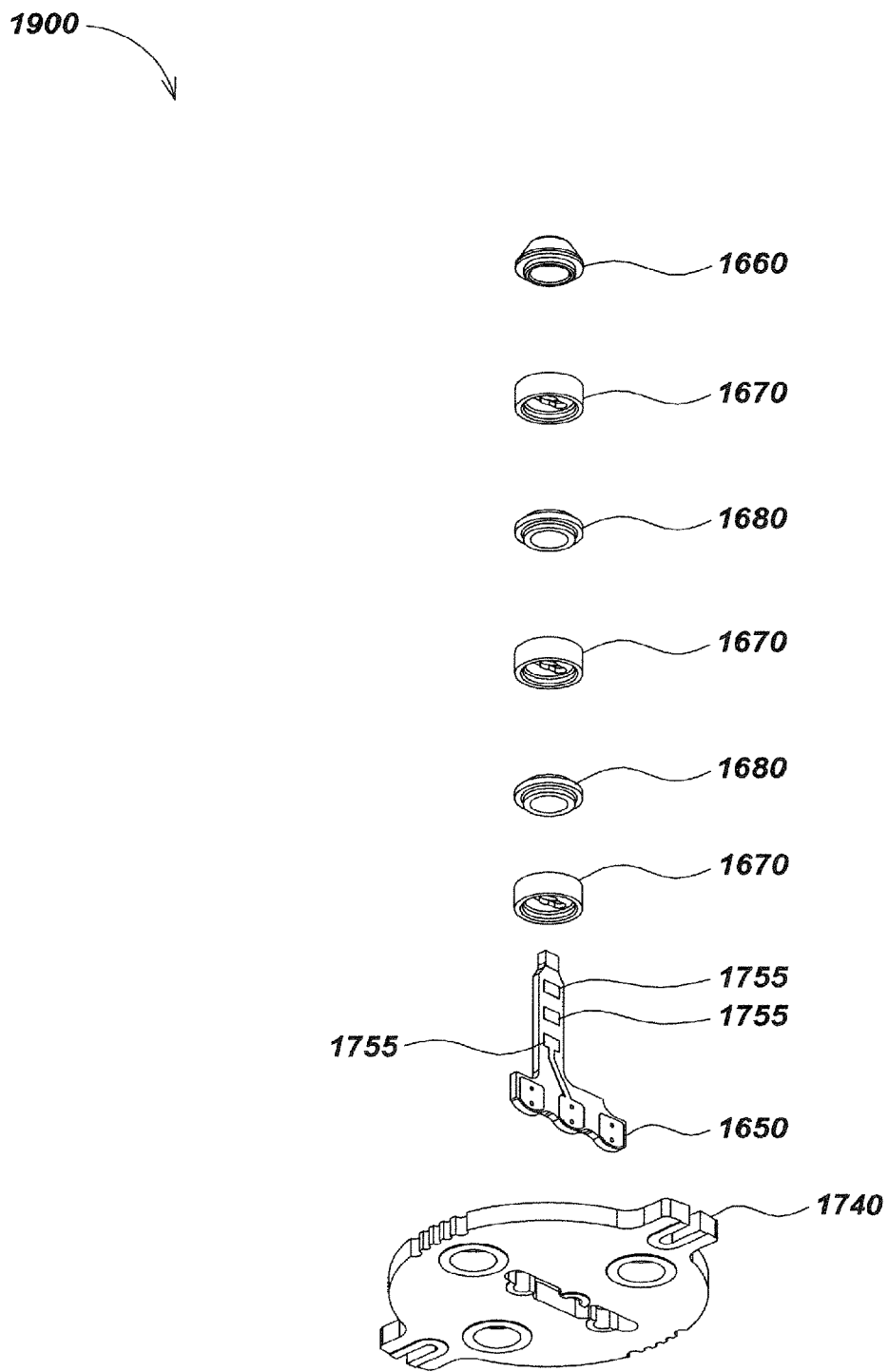
FIG. 21 is a bottom up exploded view of details of the contact ring module embodiment of FIG. 19.
Figure 22:
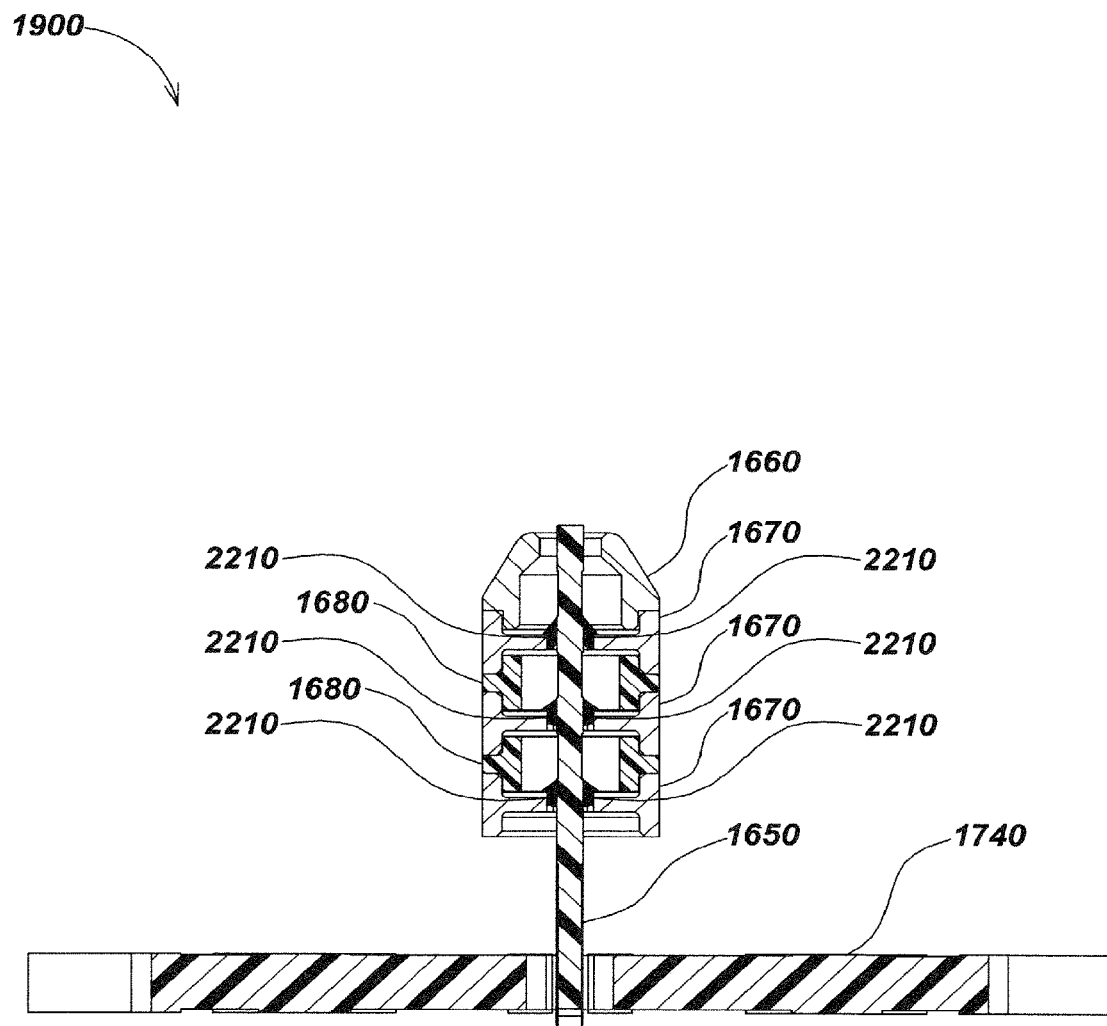
FIG. 22 is a sectional view of details of the contact ring module embodiment of FIG. 19 taken along line 22-22.
Figure 23:
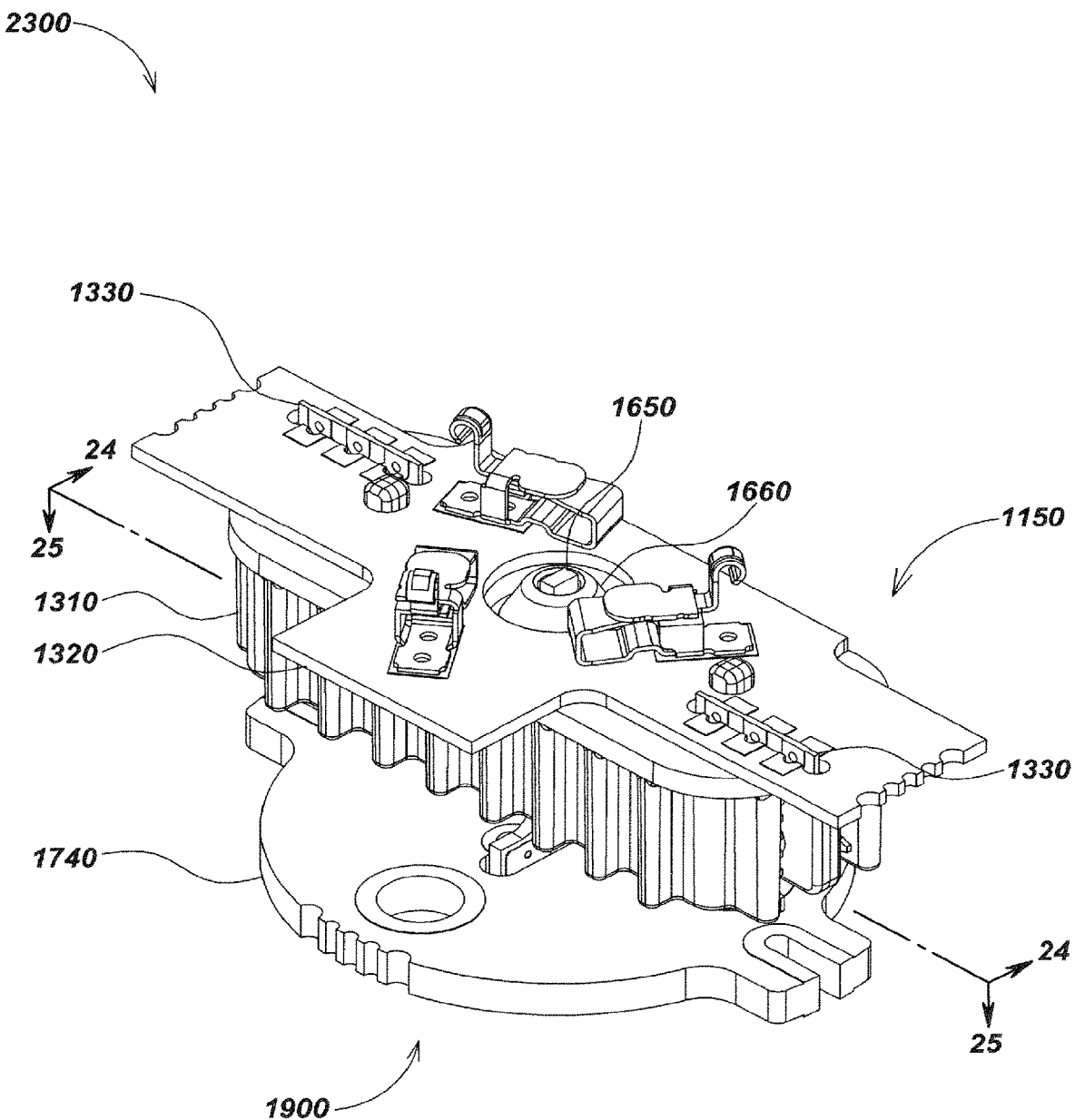
FIG. 23 is an isometric view of details of an embodiment of a rotating contact element.
Figure 24:
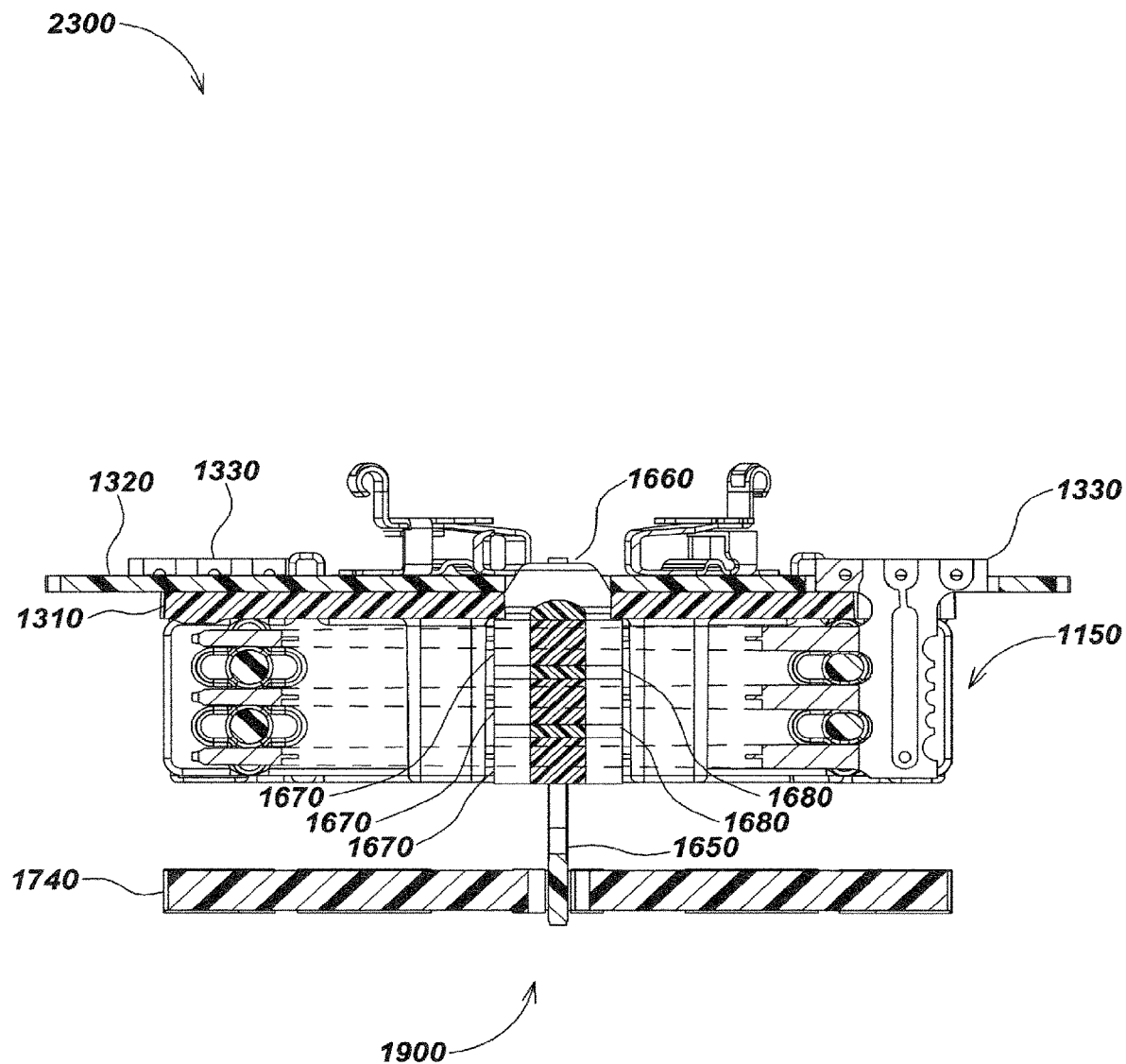
FIG. 24 is a sectional view of details of the rotating contact element embodiment of FIG. 23 taken along line 24-24.

It is noted in this exemplary embodiment there are a total of three of the contact rings 1670. However, in alternative embodiments the number of contacts rings may be increased or decreased to suit the number of electrical pathways as required by a particular application. In addition, redundant contact rings may be used to provide additional electrical pathways. The contact pads 1755 (FIG. 20) may be formed on the contact ring PCB 1650 such that one of each of the contact rings 1670 may be secured to the contact ring PCB 1650 about each of the contact pads 1755 (FIG. 20). For instance, solder such as the solder 2210 (FIG. 22) may be used to secure one contact ring 1670 to each contact pad 1755 (FIG. 20) of the contact ring PCB 1650. An electrical pathway may thereby be created through the contact pads 1755 (FIG. 20) to each of the contact rings 1670. In some embodiments, low temperature, compliant solder may be used to increase ease of assembly as well as durability. Examples of such solder may be found in WS-852 from Alpha® and/or Indium Corporation Indalloy® 281 or 282.

Figure 25:
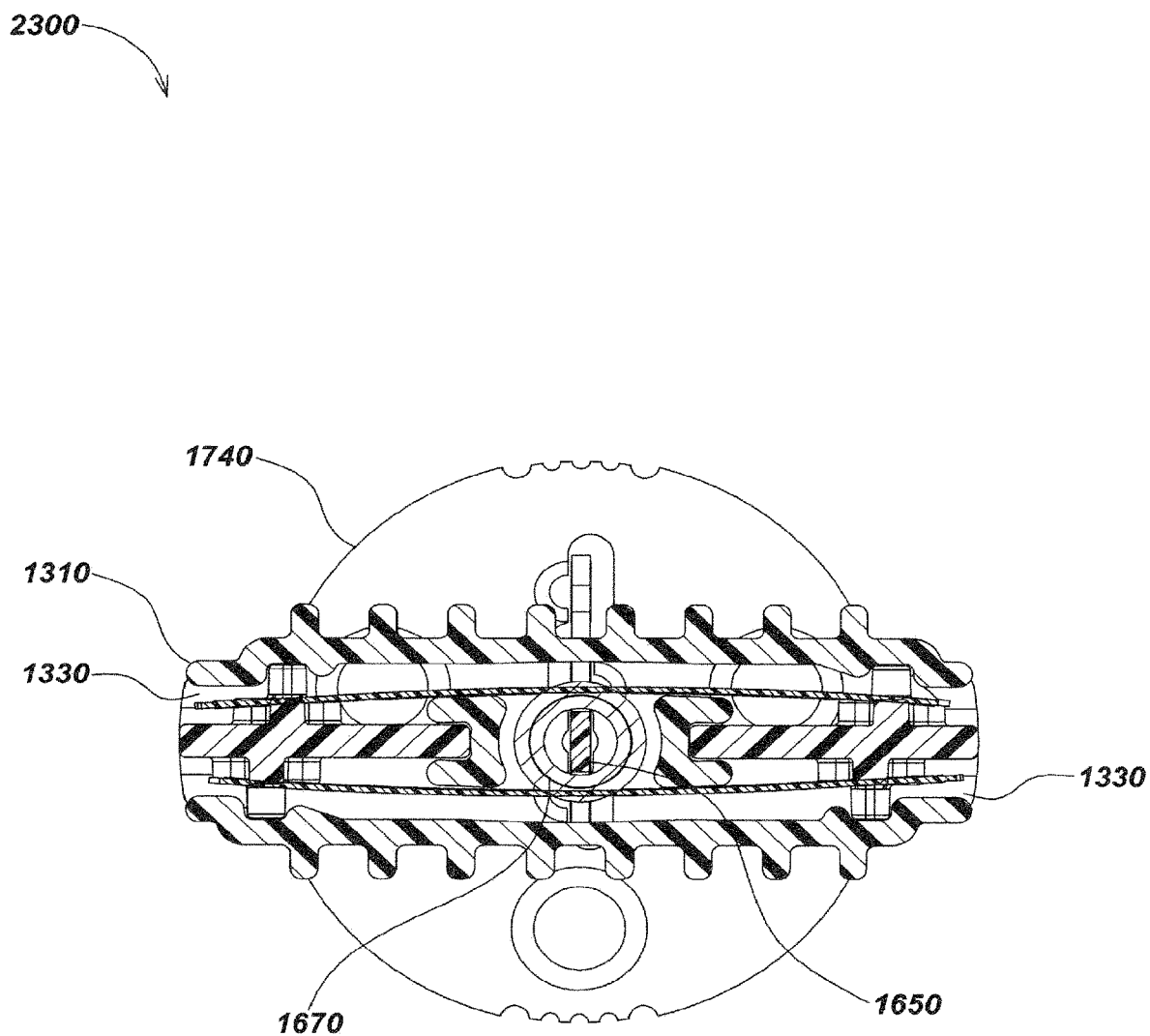
FIG. 25 is a sectional view of details of the rotating contact element embodiment of FIG. 23 taken along line 25-25.
Figure 26:
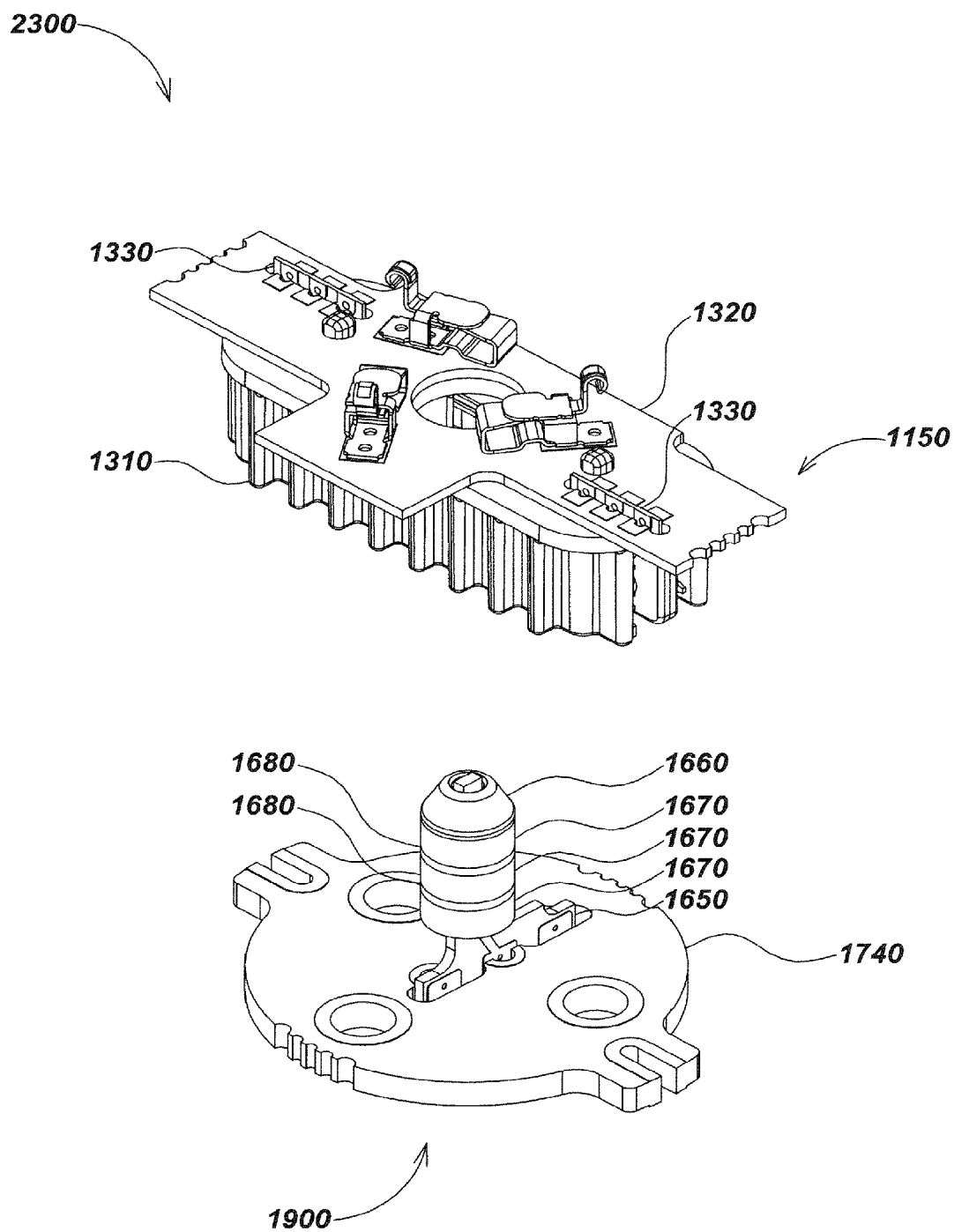
FIG. 26 is an exploded view of details of the rotating contact element embodiment of FIG. 23.

Turning to FIGS. 23-26, a rotating contact element 2300 in accordance with aspects of the present disclosure may include brush contact module 1150 and contact ring module 1900. When assembled, the contact guide cap 1660, the contact rings 1670, and dielectric separator rings 1680 seated along the upward extending arm of the contact ring PCB 1650 may be seated within the central opening formed through the brush cartridge 1310 and the contact PCB 1320. Each of the contact rings 1670 may be position such that each contact ring 1670 may contact pathways on one tine of each of the PCB brushes 1330. As best illustrated in FIG. 25, each tine of the PCB brushes 1330 may be made to bend and flex about the contact rings 1670. Printed circuit board technologies and manufacturing processes may be particularly suited to the fabrication of contact brushes, such as the PCB brushes 1330, due to the variety of parameters readily customizable to fit the specific application of the contact brush. For instance, substrate thickness, substrate material, width and length of the bending elements, and shape or geometry of the contact brush are parameters which may be readily customized to fit a particular application. In use, as the central self-leveling module 340 (FIG. 3) may be made to rotate freely in respect to the front self-leveling inner case 330 (FIG. 3) and the rear self-leveling inner case 350 (FIG. 3), the PCB brushes 1330 may continue to make contact with the contact rings 1670 as rotations from self-leveling occur.

Figure 27:
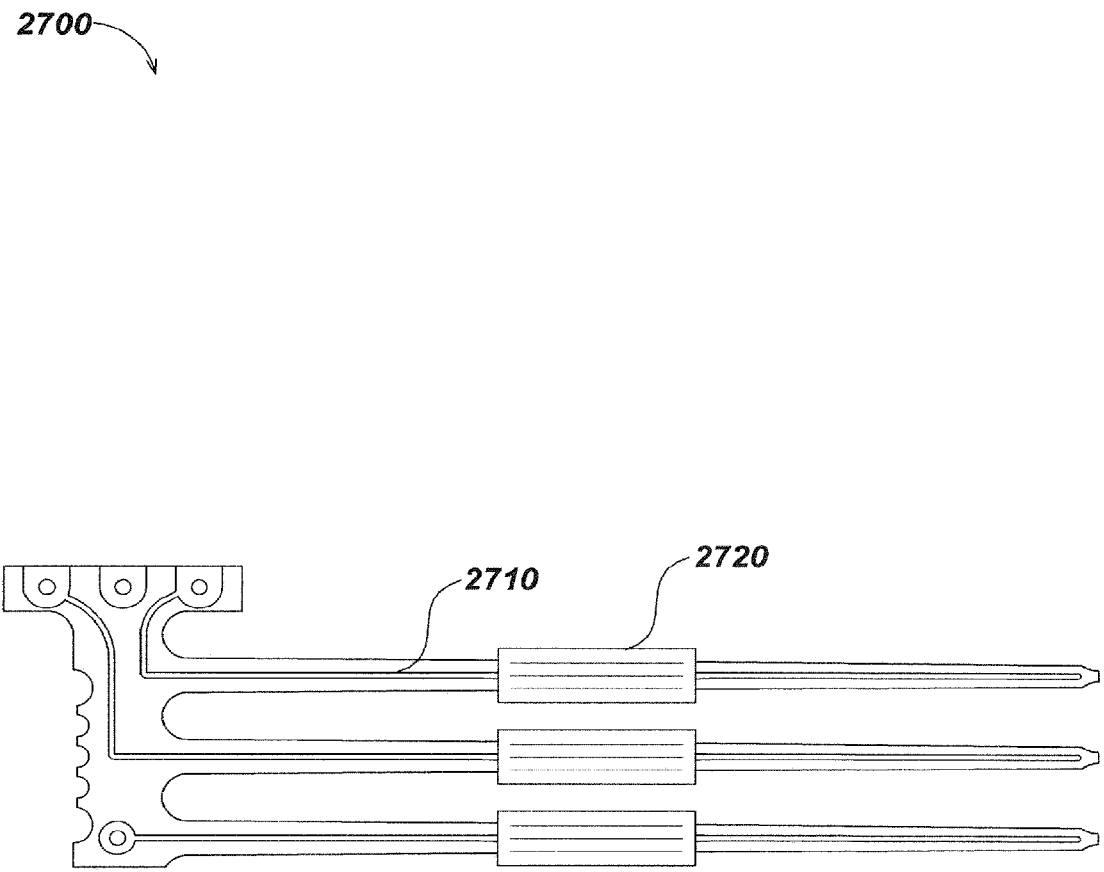
FIG. 27 is a front isometric view details of an embodiment of a PCB brush element with bifurcated trace attachments.

In some alternative embodiments, the contact area between the PCB brush or brushes and contact rings may be enhanced in various ways that may, for instance, create redundancy in electrical contact with the contact ring, increase durability of the PCB brush at this contact area, and/or reduce friction between the PCB brush and contact rings. These contact area enhancements may include, but are not limited to, wire bonding a pattern of gold wires, attaching of short sections of silver wire to signal traces, and/or attaching micro blocks of silver graphite to the contact areas. In FIG. 27, the PCB brush 2700 contains a series of signal traces 2710 onto which a trifurcated wire bonding attachment 2720 may be secured along the area of contact between the PCB brush 2700 and a contact ring. As one signal trace 2710 may run down each of the three tines of the PCB brush 2700, a total of three trifurcated wire bonding attachments 2720 may be used in each contact area along each tine. In alternative embodiments, a different quantity of tines, signal traces, and attachments may be used. The trifurcation of the bonded wires with each trifurcated wire bonding attachment 2720 may allow for redundancy in electrical contact made with a contact ring.

Figure 28:
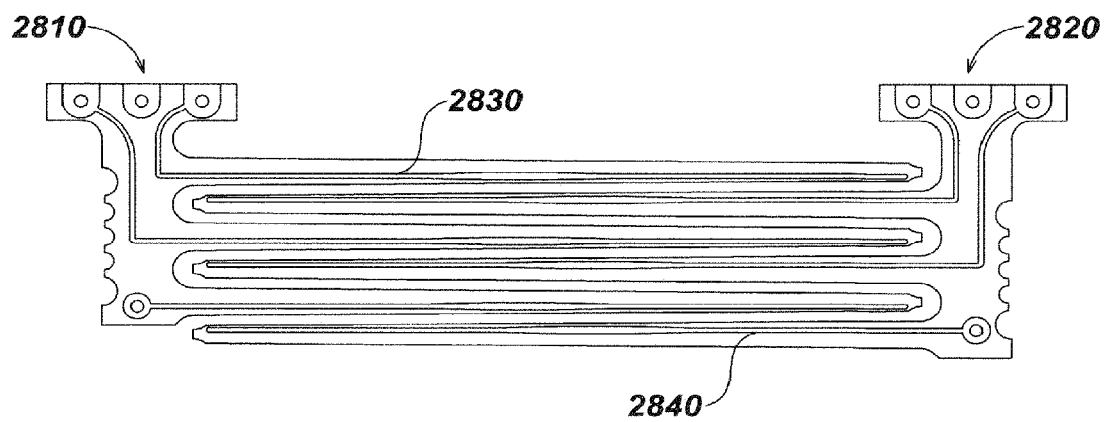
FIG. 28 is a front isometric view of details of an embodiment of a pair of interleaving PCB brush elements.
Figure 29:
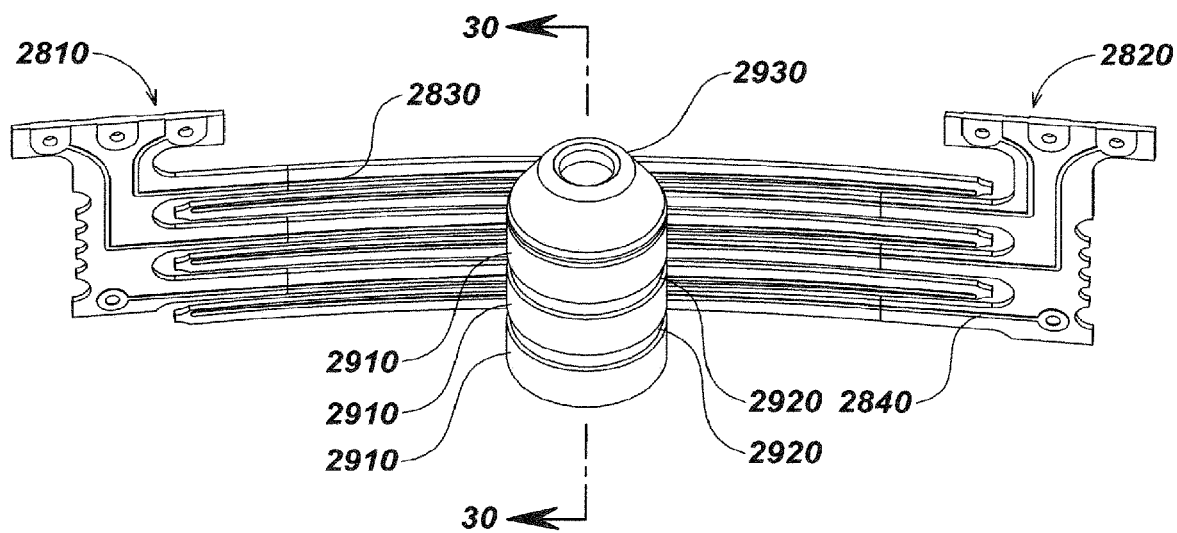
FIG. 29 is an isometric view of the interleaved PCB brush element embodiments of FIG. 28 situated as they may be made to bend or flex about an assembly of an embodiment of a cylindrical ring assembly including a contact guide cap, contact rings, and dielectric separator rings.
Figure 30:
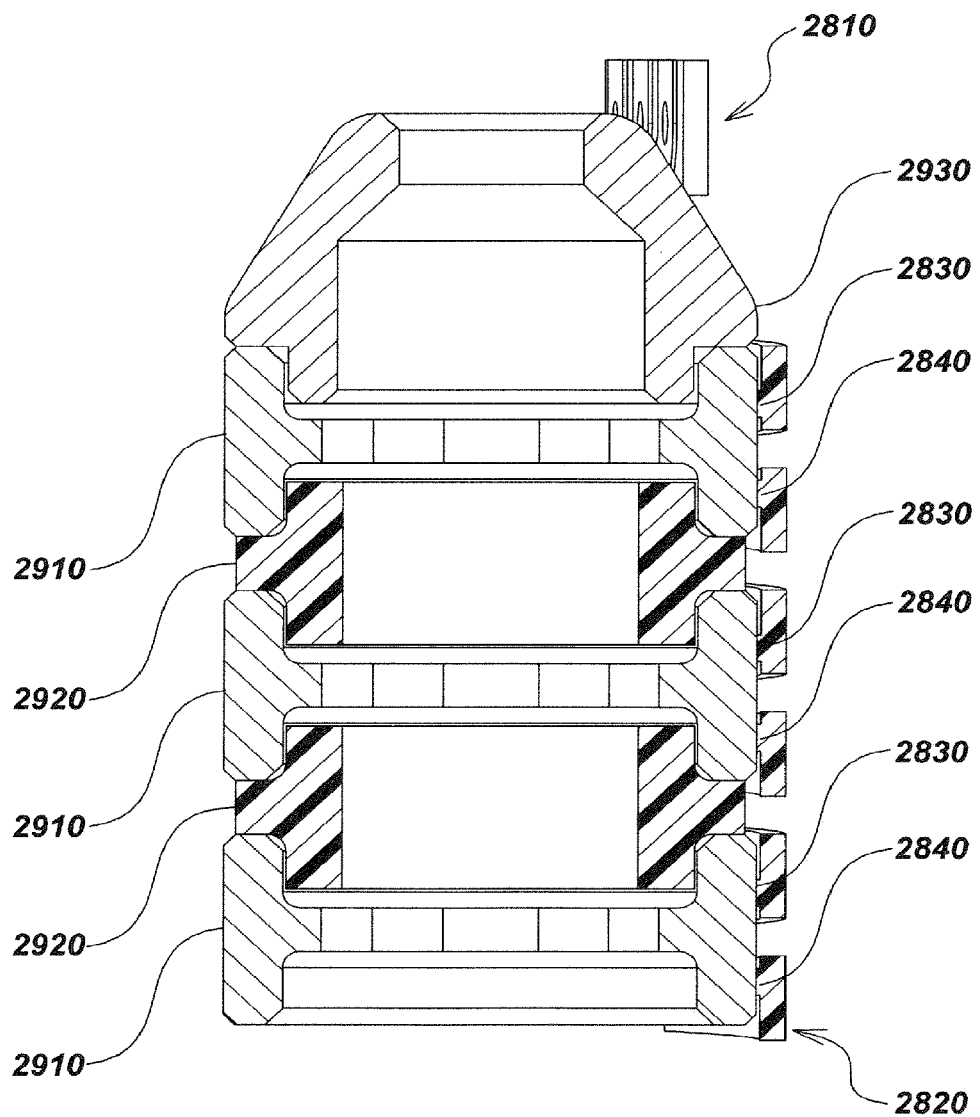
FIG. 30 is a sectional view of details of the embodiment of FIG. 29 along line 30-30.

Redundancy in electrical contacts with contact rings may also be achieved by creating multiple PCB brushes with interleaving tines such that multiple contacts may be made with each contact ring. As illustrated in FIGS. 28-30, a left PCB brush 2810 and a right PCB brush 2820 may be made such that the tines of each may interleave. Signal traces, such as the left PCB signal traces 2830 and the right PCB signal traces 2840, may run along the length of each tine such that each signal trace is offset nearest its redundant signal trace on the opposite PCB brush. For example, the left PCB brush signal traces 2830 may run along the lower section of each tine of the left PCB brush 2810 whereas the redundant right PCB brush signal traces 2840 may run along the upper section of each tine on the right PCB brush 2820. The top tines, middle tines, and bottom tines of the left PCB brush 2810 and the right PCB brush 2820 with offset signal traces may thereby make electrical contact with a top, middle, and bottom ones of the contact rings 2910 (FIGS. 29 and 30) respectively. As illustrated in FIGS. 29 and 30, the contact rings 2910 may be separated by dielectric separator rings 2920 and may have a contact guide cap 2930 similar to embodiments illustrated in FIGS. 19-22. In some embodiments, the contact rings and contact guide cap, such as the contact rings 2910 and contact guide cap 2930, may be formed with beveled edges. In such embodiments a smaller diameter separator ring, such as the dielectric separator rings 2920, may be used so as to allow the contact rings to protrude further outward. Such geometry of contact rings, guide caps, and separator rings may aid in preventing unnecessary wear of contacts on the PCB brushes such as the left PCB brush 2810 and the right PCB brush 2820.

Figure 33:
FIG. 33 illustrates details of an example embodiment of a camera head including aspects of the disclosure usable for miniaturization, along with similar prior art camera head and coins to illustrate relative size.

In one aspect, use of slip rings as described herein may advantageously allow smaller and/or lighter camera heads or other devices where electrical contacts between moving elements need to be maintained. For example, FIG. 33 illustrates reduction of size as may be implemented in a camera head embodiment 3320 in accordance with aspects disclosed herein. Camera head 3320 includes a slip ring embodiment as described herein, as well as counterweight size and mass reduction. Camera head 3310 is a prior art camera head using a traditional slip ring configuration. Both camera heads are shown with coins to illustrate their sizes and the size reduction of camera head 3320.

Figure 34:
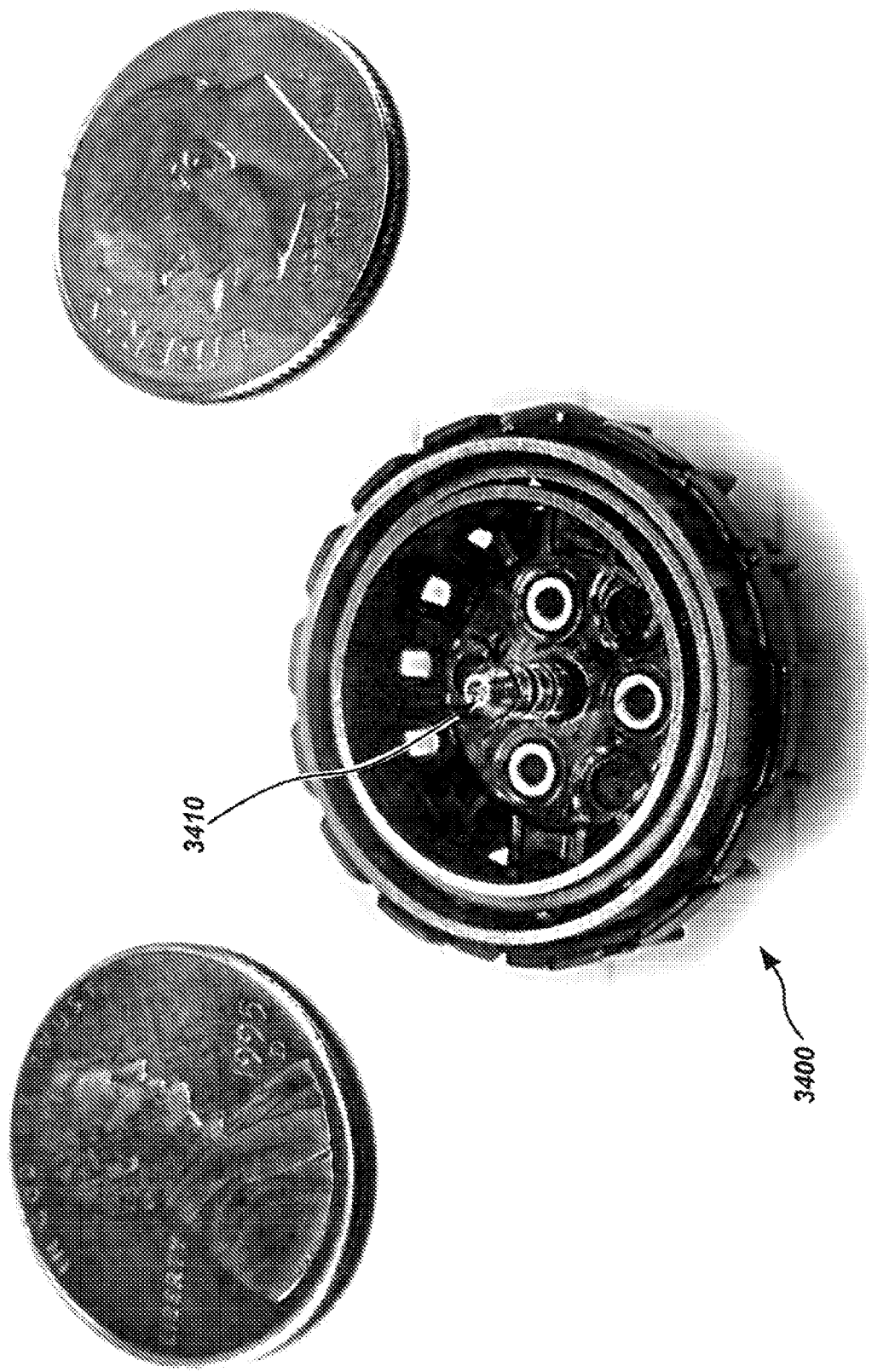
FIG. 34 illustrates details of an embodiment of components of a camera head interior including a cylindrical ring assembly, along with coins to illustrate relative size.

FIG. 34 illustrates details of internal components of camera head 3320, including a cylindrical ring assembly 3410 disposed within a self leveling case embodiment 3400, which may correspond with case 350 as described previously herein.

Figure 35:
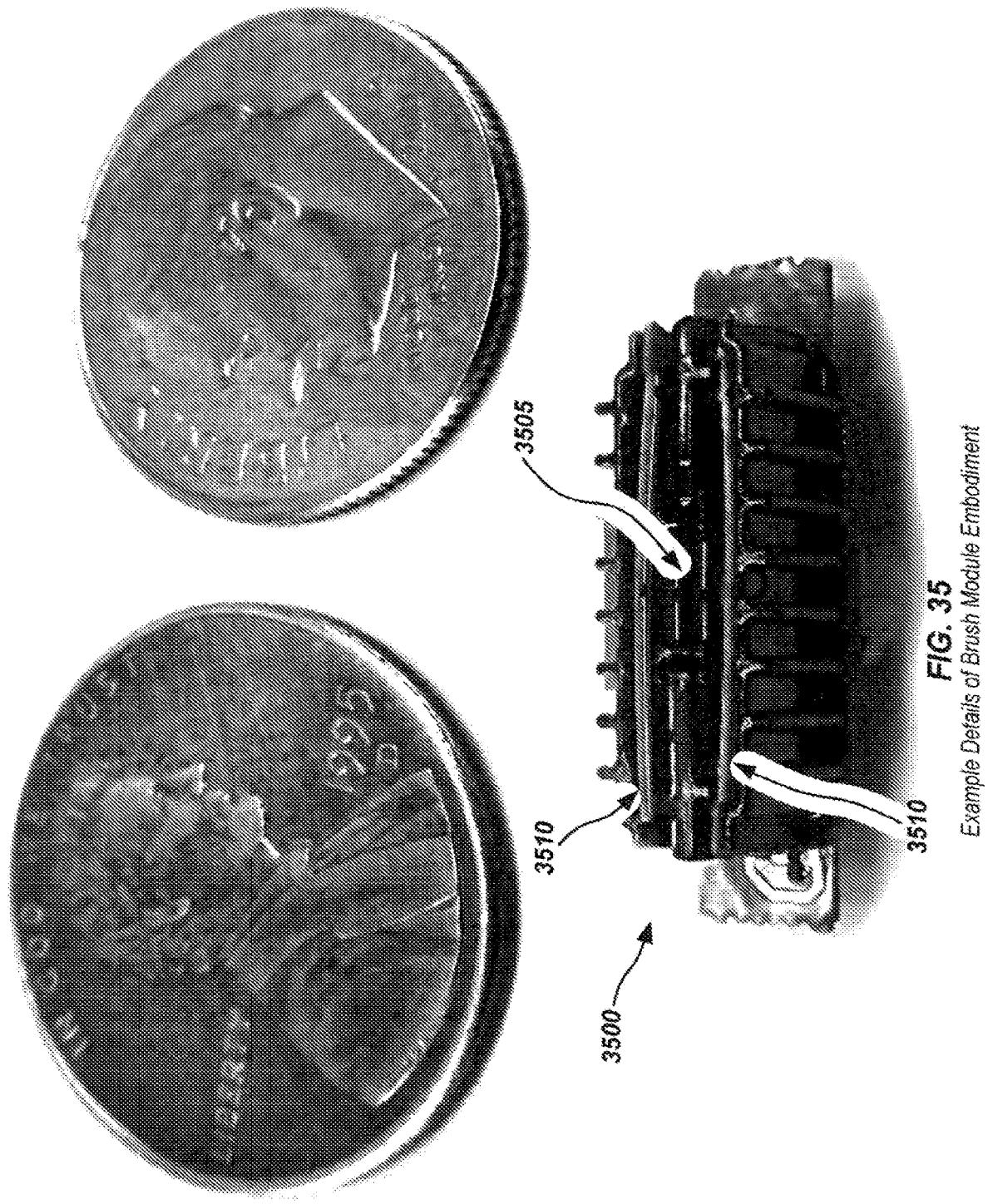
FIG. 35 illustrates details of an embodiment of components of a camera head interior including a brush module and flexible printed circuit board brushes, along with coins to illustrate relative size.

FIG. 35 illustrates a corresponding brush module embodiment showing brush elements 3510. In the assembled configuration, the cylindrical ring assembly 3410 is positioned at location 3505, relative to the two brush elements 3510.

Figure 36:
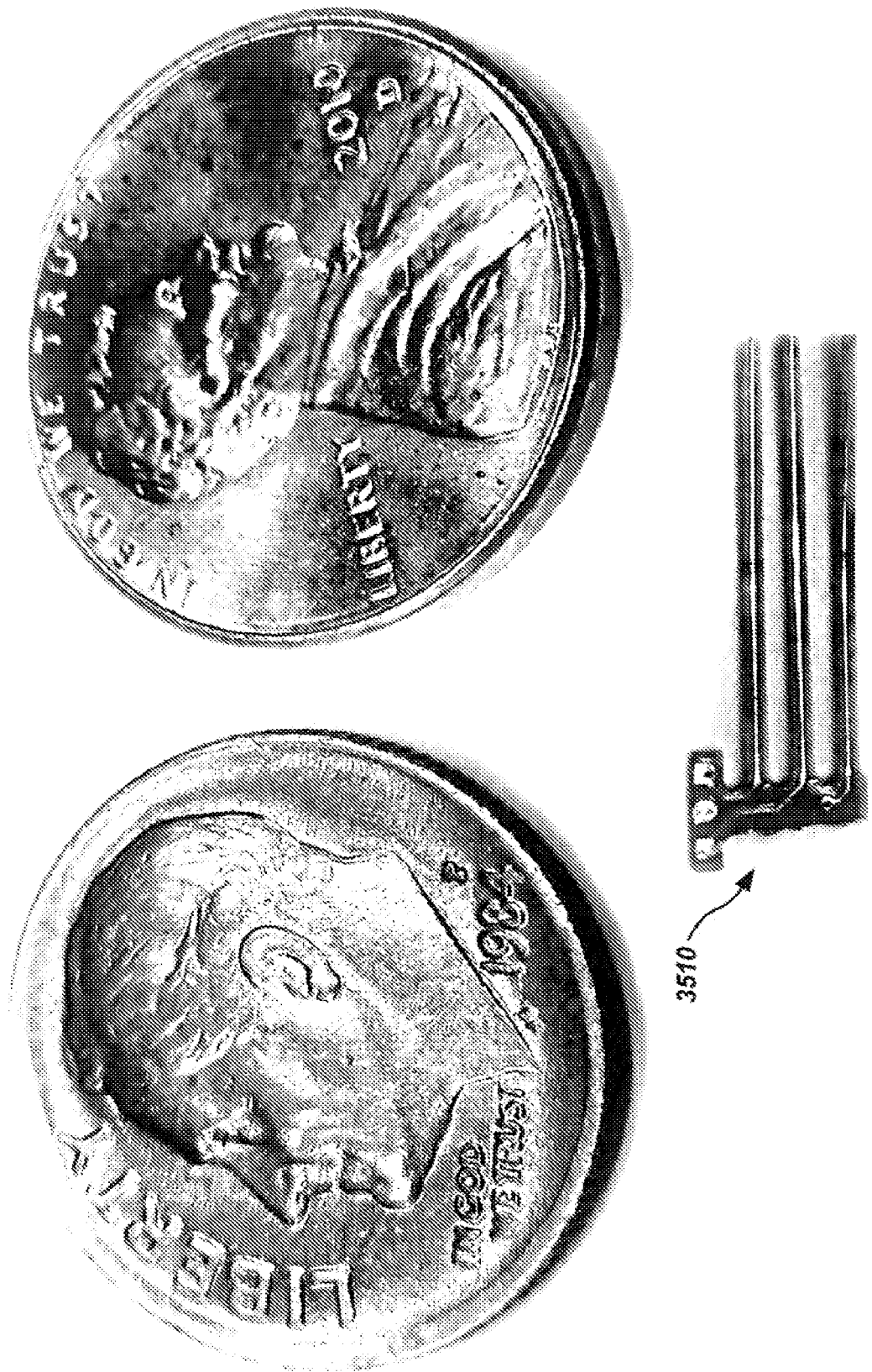
FIG. 36 illustrates details of an embodiment of a flexible printed circuit board brush element along with coins to illustrate relative size.

FIG. 36 illustrates an embodiment of a brush element 3510 showing three fingers or tines with electrical contacts in the form of printed circuit board traces disposed thereon.

Various embodiments of the disclosures described herein may be used to decrease the size of camera heads and provide additional advantages, such as reducing required weights to mechanically self-level the camera head due to decreased rotational contact areas in bearings or other moving components. Some embodiments in accordance with aspects described herein may be advantageous in implementing highly miniaturized and/or lightweight camera heads and associated inspection systems.

The claims of the present invention are not intended to be limited to the aspects shown herein, but are to be accorded the full scope consistent with the language and drawings herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein but is to be accorded the widest scope consistent with the appended claims and their equivalents.

We claim:

1. An electrical contact assembly for use in a video camera head having housing and an imager disposed in the housing, comprising:

a first element movable relative to the housing on which the imager is disposed;

a second element rotationally movable relative to the first element, the second element including an electrical output connection; and a slip ring coupled between the first element and the second element to provide an electrical contact connection between an output of the imager and the electrical output connection, wherein the slip ring comprises:

a cylindrical rotor assembly including a plurality of electrical contacts disposed circumferentially thereon; and a stator assembly disposed in flexion around the cylindrical rotor assembly, the stator assembly including one or more printed circuit board brush elements having electrical contacts thereon, where the electrical contacts are electrical circuit traces on the one or more printed circuit board brush elements for providing electrical coupling to corresponding rotor assembly electrical contacts and where the brush element electrical contacts are held in contact with corresponding ones of the one or more ring electrical contacts through flexion of the stator assembly.

2. The assembly of claim 1, wherein the printed circuit board brush element electrical contacts comprise one or more of palladium, nickel, rhodium, and hard gold.

3. The assembly of claim 1, wherein the cylindrical rotor assembly includes three or more contact rings and one or more dielectric separate rings.

4. The assembly of claim 1, further including a contact guide cap.

5. The assembly of claim 1, further comprising a grease or flypaper placed inside the housing on one or more contact surfaces of the slip ring to scavenge dirt and debris.

6. The assembly of claim 1, wherein at least one of the electrical connections is soldered with a low temperature, compliant solder.

7. The assembly of claim 1, wherein the position of the slip rings and brushes are interchanged between the first element and the second element.

8. The assembly of claim 1, further including a contact guide cap and a grease or flypaper element placed inside the housing on one or more contact surfaces of the slip ring to scavenge dirt and debris;

wherein the printed circuit board brush element electrical contacts comprise one or more of palladium, nickel, rhodium, and hard gold and the cylindrical rotor assembly includes three or more contact rings and one or more dielectric separate rings.

\* \* \* \* \*